United States Patent
Jung et al.

(10) Patent No.: US 11,381,121 B2
(45) Date of Patent: Jul. 5, 2022

(54) APPARATUS AND METHOD FOR CONTROLLING POWER TRANSMISSION COVERAGE OF WIRELESS POWER TRANSMISSION NETWORK

(71) Applicant: GE HYBRID TECHNOLOGIES, LLC, Niskayuna, NY (US)

(72) Inventors: Chun Kil Jung, Suwon-si (KR); Sang Youn Noh, Suwon-si (KR)

(73) Assignee: GE HYBRID TECHNOLOGIES, LLC, Niskayuna, NY (US)

( * ) Notice: Subject to any disclaimer, the term of this patent is extended or adjusted under 35 U.S.C. 154(b) by 3 days.

(21) Appl. No.: 15/535,400

(22) PCT Filed: Nov. 10, 2015

(86) PCT No.: PCT/KR2015/012035
§ 371 (c)(1),
(2) Date: Jun. 12, 2017

(87) PCT Pub. No.: WO2016/099032
PCT Pub. Date: Jun. 23, 2016

(65) Prior Publication Data
US 2017/0338685 A1    Nov. 23, 2017

(30) Foreign Application Priority Data

Dec. 16, 2014 (KR) .................. 10-2014-0181585

(51) Int. Cl.
*H02J 50/80* (2016.01)
*H02J 50/12* (2016.01)
(Continued)

(52) U.S. Cl.
CPC .............. *H02J 50/80* (2016.02); *H02J 7/007* (2013.01); *H02J 7/0021* (2013.01); *H02J 7/027* (2013.01);
(Continued)

(58) Field of Classification Search
None
See application file for complete search history.

(56) References Cited

U.S. PATENT DOCUMENTS 8,823,319 B2      9/2014  Von Novak, III et al.
2007/0273486 A1  11/2007  Shiotsu et al.
(Continued)

FOREIGN PATENT DOCUMENTS

KR    1020110137393    12/2011
KR    1020130033867     4/2013
(Continued)

OTHER PUBLICATIONS

"PCT Application No. PCT/KR2015/011714 International Preliminary Report on Patentability", dated May 18, 2017, 11 pages.
(Continued)

*Primary Examiner* — Daniel Kessie
(74) *Attorney, Agent, or Firm* — Delizio, Peacock, Lewin & Guerra, PLLC

(57) ABSTRACT

An apparatus and a method for controlling the power transfer coverage of a wireless power transmission network are disclosed. The method for controlling the power transfer coverage of a wireless power transmission network, which includes a plurality of peripheral devices for receiving power from a main device through a resonant channel within the power transfer coverage of the main device, comprises the steps of: checking a wireless power transmission network disconnection state of any one of the plurality of peripheral devices by a procedure gradually decreasing the amount of transmission power of the main device; and forming the power transfer coverage on the basis of the amount of transmission power at the moment of the wireless power transmission network disconnection.

20 Claims, 24 Drawing Sheets

(51) Int. Cl.
*H02J 50/90* (2016.01)
*H02J 7/02* (2016.01)
*H02J 7/00* (2006.01)
*H02J 50/40* (2016.01)

(52) U.S. Cl.
CPC .............. *H02J 50/12* (2016.02); *H02J 50/90* (2016.02); *H02J 7/00036* (2020.01); *H02J 7/025* (2013.01); *H02J 50/40* (2016.02)

(56) References Cited

U.S. PATENT DOCUMENTS

| | | | |
|---|---|---|---|
| 2009/0309550 A1* | 12/2009 | Liu | H02J 50/20 320/137 |
| 2010/0244576 A1 | 9/2010 | Hillan et al. | |
| 2010/0253281 A1 | 10/2010 | Li | |
| 2010/0259217 A1* | 10/2010 | Baarman | H02J 7/0013 320/108 |
| 2010/0289341 A1 | 11/2010 | Ozaki et al. | |
| 2011/0115303 A1 | 5/2011 | Baarman et al. | |
| 2011/0241437 A1 | 10/2011 | Kanno | |
| 2011/0260682 A1 | 10/2011 | Low et al. | |
| 2011/0298297 A1 | 12/2011 | van Wageningen et al. | |
| 2012/0149307 A1 | 6/2012 | Terada et al. | |
| 2013/0134927 A1 | 5/2013 | Park et al. | |
| 2013/0162200 A1 | 6/2013 | Terry et al. | |
| 2013/0207599 A1 | 8/2013 | Ziv et al. | |
| 2013/0221915 A1 | 8/2013 | Son et al. | |
| 2014/0009109 A1 | 1/2014 | Lee et al. | |
| 2014/0015335 A1 | 1/2014 | Lee et al. | |
| 2014/0139034 A1* | 5/2014 | Sankar | H02J 50/402 307/104 |
| 2014/0265615 A1 | 9/2014 | Kim et al. | |
| 2014/0308996 A1 | 10/2014 | Byun et al. | |
| 2014/0131216 A1 | 11/2014 | Byun et al. | |
| 2015/0008760 A1* | 1/2015 | Bae | H02J 50/80 307/104 |
| 2015/0137748 A1* | 5/2015 | Kim | H02J 50/12 320/108 |
| 2015/0189363 A1* | 7/2015 | Hsu | H04N 21/4751 725/25 |
| 2015/0380972 A1 | 12/2015 | Fort | |
| 2018/0138758 A1 | 5/2018 | Jung et al. | |

FOREIGN PATENT DOCUMENTS

| | | |
|---|---|---|
| KR | 1020130059697 A | 6/2013 |
| KR | 1020130101246 | 9/2013 |
| KR | 1020130111510 | 10/2013 |
| KR | 1020140007273 | 1/2014 |
| KR | 1020140031709 | 3/2014 |
| KR | 1020140077591 | 6/2014 |
| KR | 1020140114924 | 9/2014 |
| KR | 1020140124575 | 10/2014 |
| KR | 1020140131216 A1 | 11/2014 |
| WO | 2010057224 | 5/2010 |
| WO | 2013035873 | 3/2013 |
| WO | 2013112526 | 8/2013 |
| WO | 2016072706 | 5/2016 |
| WO | 2016072707 | 5/2016 |
| WO | 2016072709 | 5/2016 |
| WO | 2016099032 | 6/2016 |

OTHER PUBLICATIONS

"PCT Application No. PCT/KR2015/011714 International Search Report and Written Opinion", dated Feb. 29, 2016, 11 pages.
"PCT Application No. PCT/KR2015/011715 International Preliminary Report on Patentability", dated May 18, 2017, 8 pages.
"PCT Application No. PCT/KR2015/011715 International Search Report and Written Opinion", dated Feb. 16, 2016, 8 pages.
"PCT Application No. PCT/KR2015/011717 International Preliminary Report on Patentability", dated May 9, 2017, 8 pages.
"PCT Application No. PCT/KR2015/011717 International Search Report and Written Opinion", dated Feb. 29, 2016, 9 pages.
"PCT Application No. PCT/KR2015/012035 International Preliminary Report on Patentability", dated Jun. 29, 2017, 10 pages.
"PCT Application No. PCT/KR2015/012035 International Search Report and Written Opinion", dated Feb. 19, 2016, 11 pages.
"Qi System Description Wireless Power Transfer", Wireless Power Consortium, vol. 1:Low Power, Part 1:Interface Definition, Version 1.0.1, Oct. 2010, 88 pages.
"U.S. Appl. No. 15/522,773 Final Office Action", dated Jun. 13, 2019, 32 pages.
"U.S. Appl. No. 15/522,773 Office Action", dated Oct. 4, 2018, 26 pages.
"U.S. Appl. No. 15/522,773 Office Action", dated Jan. 8, 2020, 23 pages.
"U.S. Appl. No. 15/522,773 Final Office Action", dated Aug. 21, 2020, 34 pages.
"Korean Application No. 10-2014-0181585 Office Action", dated Dec. 1, 2020, 7 pages.
"Korean Application No. 10-2014-0184408 Office Action", dated Jan. 12, 2021, 6 pages.
"U.S. Appl. No. 15/522,773 Office Action", dated Jan. 13, 2021, 35 pages.
"Korean Application No. 10-2014-0181585 Final Office Action", dated Jun. 23, 2021, 3 pages.
"U.S. Appl. No. 15/522,773 Final Office Action", dated Jul. 16, 2021, 38 pages.
"Korean Application No. 10-2021-0125899 Notification of Reason for Refusal", dated Jan. 25, 2022, 5 pages.
"Korean Application No. 10-2021-0148176 Notification of Reason for Refusal", dated Feb. 21, 2022, 7 pages.

* cited by examiner

FIG. 11
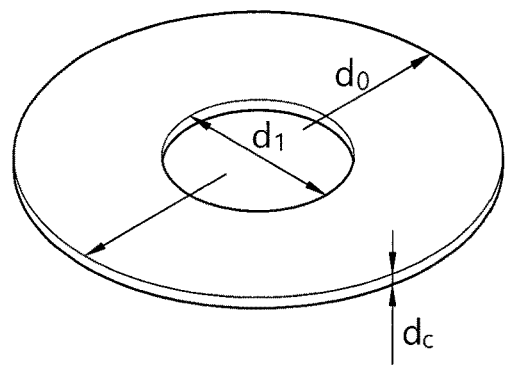
(a)
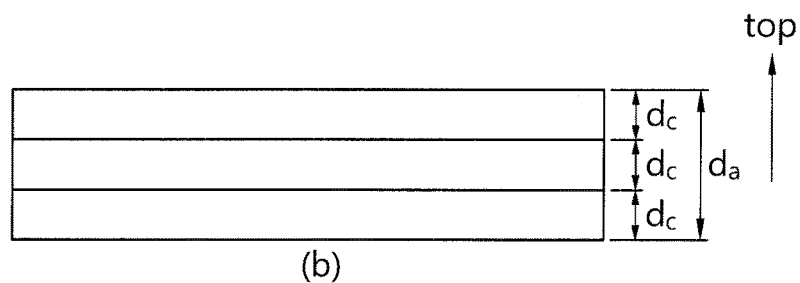
(b)
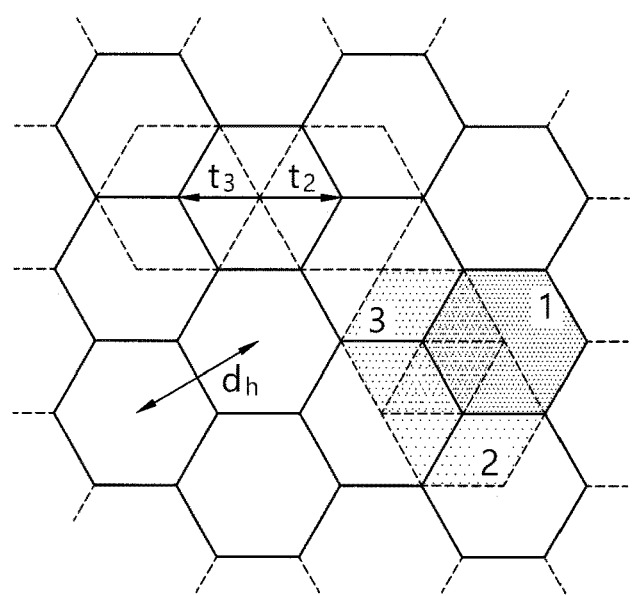
(c)

● Pressure sensor and/or temperature sensor

APPARATUS AND METHOD FOR CONTROLLING POWER TRANSMISSION COVERAGE OF WIRELESS POWER TRANSMISSION NETWORK

CROSS-REFERENCE TO RELATED APPLICATIONS

This application is a national stage of International Application No. PCT/KR2015/012035, filed Nov. 10, 2015, which claims the benefit of priority to Korean Application No. 10-2014-0181585, filed Dec. 16, 2014 in the Korean Intellectual Property Office, the disclosures of which are incorporated herein by reference.

TECHNICAL FIELD

A technical field relates to control of power transfer coverage in a wireless power transmission network over which power is transmitted or received wirelessly.

BACKGROUND ART

A wireless power transmission network may be provided by a wireless power transmission and charging system. Furthermore, a wireless power transmission network may be applied to a local computing environment.

A wireless power transmission system includes a wireless power transmission apparatus which wirelessly transmits electrical energy and a wireless power reception apparatus which receives electrical energy from the wireless power transmission apparatus.

If the wireless power transmission system is used, for example, by simply placing a mobile phone on a charging pad without connecting the mobile phone to a separate charging connector, the battery of the mobile phone can be charged.

A method for wirelessly transferring electrical energy may be divided into a magnetic induction method, a magnetic resonance method and an electromagnetic method depending on the principle that electrical energy is transferred.

The magnetic induction method is a method for transferring electrical energy using a phenomenon in which electricity is induced between the coil of a transmission unit and the coil of a reception unit.

The magnetic resonance method is a method for generating, by the coil of a transmission unit, a magnetic field that vibrates in a resonant frequency and intensively transferring energy to the coil of a reception unit designed to have the same resonant frequency.

The electromagnetic method is a method for receiving, by a reception unit, electromagnetic waves generated by a transmission unit using several antennas and converting the electromagnetic waves into electrical energy.

Meanwhile, a wireless power transmission technology may be divided into a flexibly coupled wireless power transfer technology (hereinafter referred to as a "flexibly coupled technology") and a tightly coupled wireless power transfer technology (hereinafter referred to as a "tightly coupled technology") depending on the type to strength of magnetic resonance coupling between a transmission unit coil and a reception unit coil.

In this case, in the case of the "flexibly coupled technology", concurrent multiple charging may be possible because magnetic resonance coupling may be formed between a single transmission unit resonator and a plurality of reception unit resonators.

In this case, the "tightly coupled technology" may be a technology in which only power transfer (one-to-one power transmission) between a single transmission unit coil and a reception unit coil is possible.

As an example in which such a wireless power transmission and charging system has been applied to a wireless power transmission network, such as a local computing environment, there was disclosed Conventional Technology 3 and Conventional Technology 5 described in "Prior Art Document."

However, local computing environments according to Conventional Technology 3 and Conventional Technology 5 do not provide a method for controlling a short-distance field distance depending on an environment.

DISCLOSURE

Technical Problem

There are proposed a wireless power transmission and charging system and proposed an improved configuration of the wireless power transmission and charging system.

Furthermore, there are provided a method and apparatus for forming optimal power transfer coverage by taking into consideration a device use environment and human body harmfulness in a wireless power transmission network.

Technical Solution

A method for controlling power transfer coverage of a wireless power transmission network including a plurality of peripheral devices supplied with power from a main device through a resonant channel within the power transfer coverage of the main device according to an embodiment of the present invention includes the steps of checking the state in which any one of the plurality of peripheral devices is disconnected from the wireless power transmission network based on a procedure for gradually decreasing the amount of transmission power of the main device and forming the power transfer coverage based on the amount of transmission power at the moment when the wireless power transmission network is disconnected.

A method for controlling power transfer coverage of a wireless power transmission network including a plurality of peripheral devices supplied with power from a main device through a resonant channel within the power transfer coverage of the main device according to another embodiment of the present invention includes the steps of confirming, by the main device, information about the identifier of each of the plurality of peripheral devices and forming the power transfer coverage by adjusting the amount of transmission power for forming the power transfer coverage or the directivity of the resonant channel based on the movable range of a movable target device of the plurality of devices based on the identifier information.

The step of forming the power transfer coverage according to yet another embodiment of the present invention includes repeatedly performing a procedure for gradually decreasing the amount of transmission power of the main device, checking the state in which the target device is disconnected from the wireless power transmission network while repeatedly performing the procedure, and forming the power transfer coverage based on the amounts of transmission power at the moments when the wireless power transmission network is disconnected.

A power transfer coverage control apparatus of a wireless power transmission network including a plurality of peripheral devices supplied with power from a main device through a resonant channel according to an embodiment includes a power transmission control unit which controls the amount of transmission power of the main device and performs a procedure for gradually decreasing the amount of transmission power and a disconnection state check unit which checks the state in which any one of the plurality of peripheral devices is disconnected from the wireless power transmission network. The power transmission control unit forms the power transfer coverage based on the amount of transmission power at the moment when the wireless power transmission network is disconnected.

A power transfer coverage control apparatus of a wireless power transmission network including a plurality of peripheral devices supplied with power from a main device through a resonant channel according to another embodiment includes an identifier information confirmation unit which confirms information about the identifier of each of the plurality of peripheral devices and a power transmission control unit which forms the power transfer coverage by adjusting the amount of transmission power for forming the power transfer coverage or the directivity of the resonant channel based on the movable range of a movable target device of the plurality of devices based on the identifier information.

Advantageous Effects

In accordance with the present invention, stable and efficient wireless power transmission and charging are possible.

Furthermore, in accordance with embodiments of the present invention, optimal power transfer coverage can be formed by taking into consideration a device use environment and human body harmfulness in a wireless power transmission network.

DESCRIPTION OF DRAWINGS

FIG. 11 is a diagram showing an example in which the primary coil array of the power transmission unit is configured.

BEST MODE

Hereinafter, embodiments of the present invention are described in detail with reference to the accompanying drawings.

Figure 1:
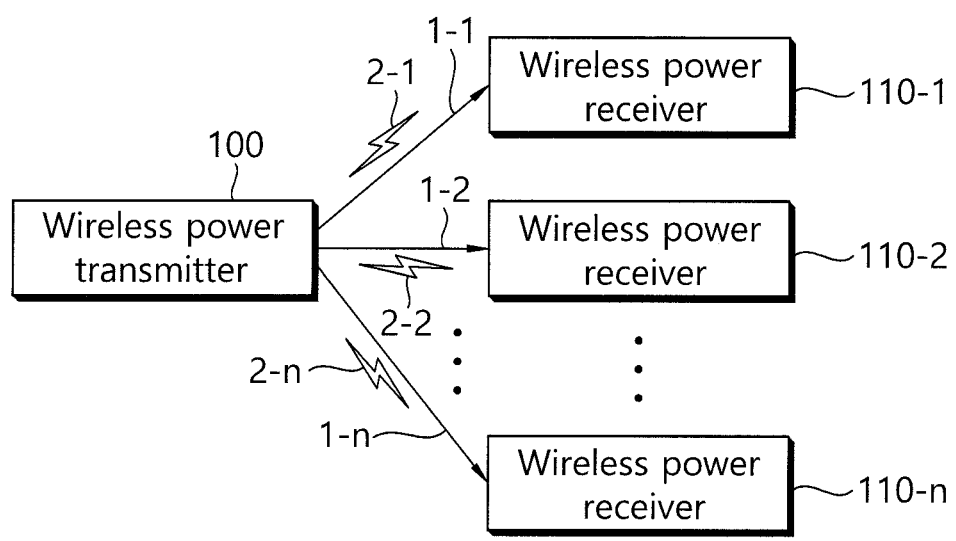
FIG. 1 is a diagram for illustrating an overall concept of a wireless power transmission system.

FIG. 1 is a diagram for illustrating an overall concept of a wireless power transmission system.

Referring to FIG. 1, a wireless charging system may wirelessly transmit power 1-1, 1-2 and 1-$n$ to a wireless power transmitter 100 and at least one wireless power receivers 110-1, 110-2 and 110-$n$, respectively. More specifically, the wireless power transmitter 100 may wirelessly transmit the power 1-1, 1-2 and 1-$n$ to only authenticated wireless power receivers on which a specific authentication procedure has been performed.

The wireless power transmitter 100 may establish electrical connection with the wireless power receivers 110-1, 110-2 and 110-$n$. For example, the wireless power transmitter 100 may transmit wireless power of an electromagnetic wave form to the wireless power receivers 110-1, 110-2 and 110-$n$.

Furthermore, the wireless power transmitter 100 may perform bi-directional communication with the wireless power receivers 110-1, 110-2 and 110-$n$. In this case, the wireless power transmitter 100 and the wireless power receivers 110-1, 110-2 and 110-$n$ may process or transmit or receive packets 2-1, 2-2 and 2-$n$ including a specific frame. The aforementioned frame is described in more detail below.

The wireless power receiver may be implemented using a mobile communication terminal, a PDA, a PMP or a smart phone.

Furthermore, the wireless power transmitter 100 may wirelessly provide power to the plurality of wireless power receivers 110-1, 110-2 and 110-n. For example, the wireless power transmitter 100 may transmit power to the plurality of wireless power receivers 110-1, 110-2 and 110-n through a resonant method. If the wireless power transmitter 100 adopts the resonant method, the distance between the wireless power transmitter 100 and the plurality of wireless power receivers 110-1, 110-2 and 110-n may preferably be 30 m or less. Furthermore, if the wireless power transmitter 100 adopts the electromagnetic induction method, the distance between the wireless power transmitter 100 and the plurality of wireless power receivers 110-1, 110-2 and 110-n may preferably be 10 cm or less.

Furthermore, the wireless power transmitter 100 may include display means, such as a display, and may display the state of each of the wireless power receivers 110-1,110-2 and 110-n based on a message received from each of the wireless power receivers 110-1, 110-2 and 110-n. Furthermore, the wireless power transmitter 100 may also display the time expected until the changing of each of the wireless power receivers 110-1,110-2 and 110-n is completed.

Furthermore, the wireless power transmitter 100 may transmit a control signal to each of the wireless power receivers 110-1, 110-2 and 110-n so that each of the wireless power receivers 110-1, 110-2 and 110-n disables a wireless charging function. The wireless power receiver that has received the control signal to disable the wireless charging function from the wireless power transmitter 100 may disable the wireless charging function.

Each of the wireless power receivers 110-1, 110-2 and 110-n may receive wireless power from the wireless power transmitter 100 and may perform the charging of a battery embedded therein. Furthermore, each of the wireless power receivers 110-1, 110-2 and 110-n may transmit a signal that requests wireless power transmission, information necessary to receive wireless power, wireless power receiver state information or control information of the wireless power transmitter 100 to the wireless power transmitter 100. The information of the transmission signal is described in more detail below.

Furthermore, each of the wireless power receivers 110-1, 110-2 and 110-n may transmit a message indicative of a charging state to the wireless power transmitter 100.

Figure 2:
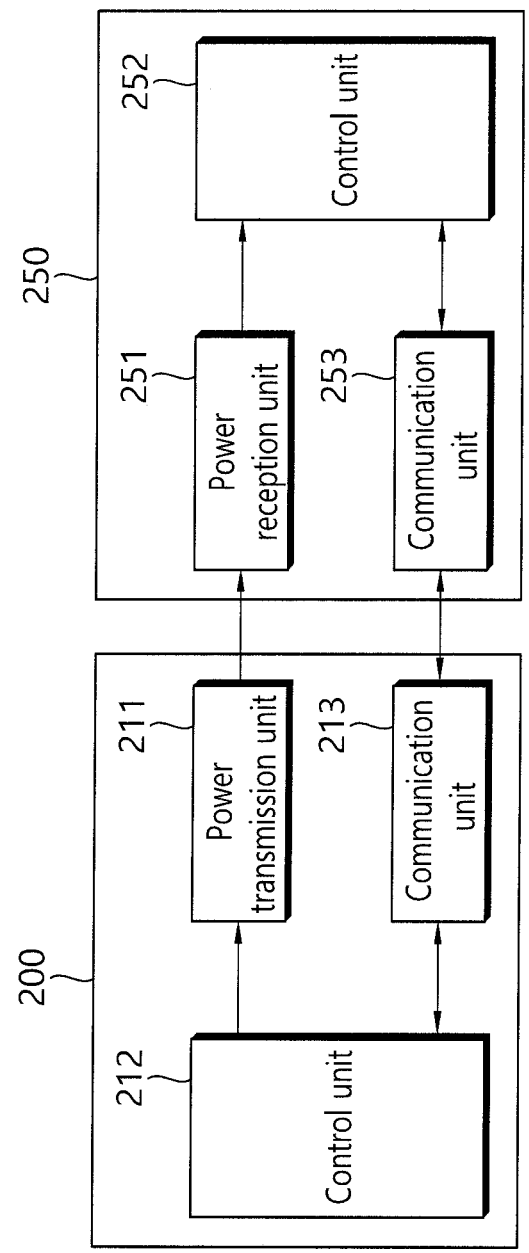
FIG. 2 is a block diagram of a wireless power transmitter and a wireless power receiver according to an embodiment of the present invention.

FIG. 2 is a block diagram of a wireless power transmitter and a wireless power receiver according to an embodiment of the present invention.

Referring to FIG. 2, the wireless power transmitter 200 may include a power transmission unit 211, a control unit 212, and a communication unit 213. Furthermore, the wireless power receiver 250 may include a power reception unit 251, a control unit 252, and a communication unit 253.

The power transmission unit 211 may provide power required by the wireless power transmitter 200 and wirelessly provide power to the wireless power receiver 250. In this case, the power transmission unit 211 may supply power in the form of an AC waveform, and may also convert power into an AC waveform using an inverter while supplying the power in the form of a DC waveform and supply the power in the form of an AC waveform. The power transmission unit 211 may be implemented in the form of an embedded battery or may be implemented in the form of a power reception interface so that it receives external power and supplies the received power to other elements. Those skilled in the art will easily understand that the power transmission unit 211 has no limit to any means if the means can provide power of a specific AC waveform.

Furthermore, the power transmission unit 211 may provide an AC waveform of an electromagnetic wave form to the wireless power receiver 250. The power transmission unit 211 may further include a loop coil. Accordingly, the power transmission unit 211 may transmit or receive specific electromagnetic waves. If the power transmission unit 211 is implemented using the loop coil, inductance L of the loop coil may be changed. Meanwhile, those skilled in the art will easily understand that the power transmission unit 211 has no limit to any means if the means can transmit or receive electromagnetic waves.

The control unit 212 may control an overall operation of the wireless power transmitter 200. The control unit 212 may control an overall operation of the wireless power transmitter 200 using an algorithm, program or application that is required for control of data read from a storage unit (not shown). The control unit 212 may be implemented in a form, such as a CPU, a microprocessor or a mini-computer. A detailed operation of the control unit 212 is described in more detail below.

The communication unit 213 may perform communication with the wireless power receiver 250 using a specific method. The communication unit 213 may perform communication with the communication unit 253 of the wireless power receiver 250 using near field communication (NFC), Zigbee communication, infrared communication or visible ray communication. The communication unit 213 according to an embodiment of the present invention may perform communication using a Zigbee communication method according to the IEEE 802.15.4 method. Furthermore, the communication unit 213 may use a carrier sense multiple access with collision avoidance (CSMA/CA) algorithm. A configuration regarding the selection of a frequency and channel used by the communication unit 213 is described in more detail below. Meanwhile, the aforementioned communication method is only illustrative, and the scope of right of the present invention is not restricted by a specific communication method performed by the communication unit 213.

Meanwhile, the communication unit 213 may transmit a signal for information about the wireless power transmitter 200. In this case, the communication unit 213 may unicast, multicast or broadcast the signal.

The communication unit 213 may receive power information from the wireless power receiver 250. In this case, the power information may include at least one of the capacity, the amount of remaining battery power, the charging number, the amount of power used, the battery capacity and the battery ratio of the wireless power receiver 250. Furthermore, the communication unit 213 may transmit a charging function control signal that controls the charging function of the wireless power receiver 250. The charging function control signal may be a control signal that controls the power reception unit 251 of a specific wireless power receiver 250 so that the specific wireless power receiver 250 enables or disables its charging function.

Furthermore, the communication unit 213 may receive a signal from another wireless power transmitter (not shown) in addition to the wireless power receiver 250. For example, the communication unit 213 may receive a notice signal of a frame from another wireless power transmitter.

Meanwhile, in FIG. 2, the power transmission unit 211 and the communication unit 213 have been illustrated as being different hardware and the wireless power transmitter 200 has been illustrated as performing communication in an out-band form, but this is illustrative. In the present invention, the power transmission unit 211 and the communication unit 213 may be implemented in one piece of hardware, so the wireless power transmitter 200 can perform communication in an in-band form.

The wireless power transmitter 200 and the wireless power receiver 250 may transmit or receive a variety of types of signals. Accordingly, the joining of the wireless power receiver 250 to a wireless power network controlled by the wireless power transmitter 200 and a charging process through wireless power transmission or reception may be performed. The aforementioned process is described in more detail below.

Figure 3:
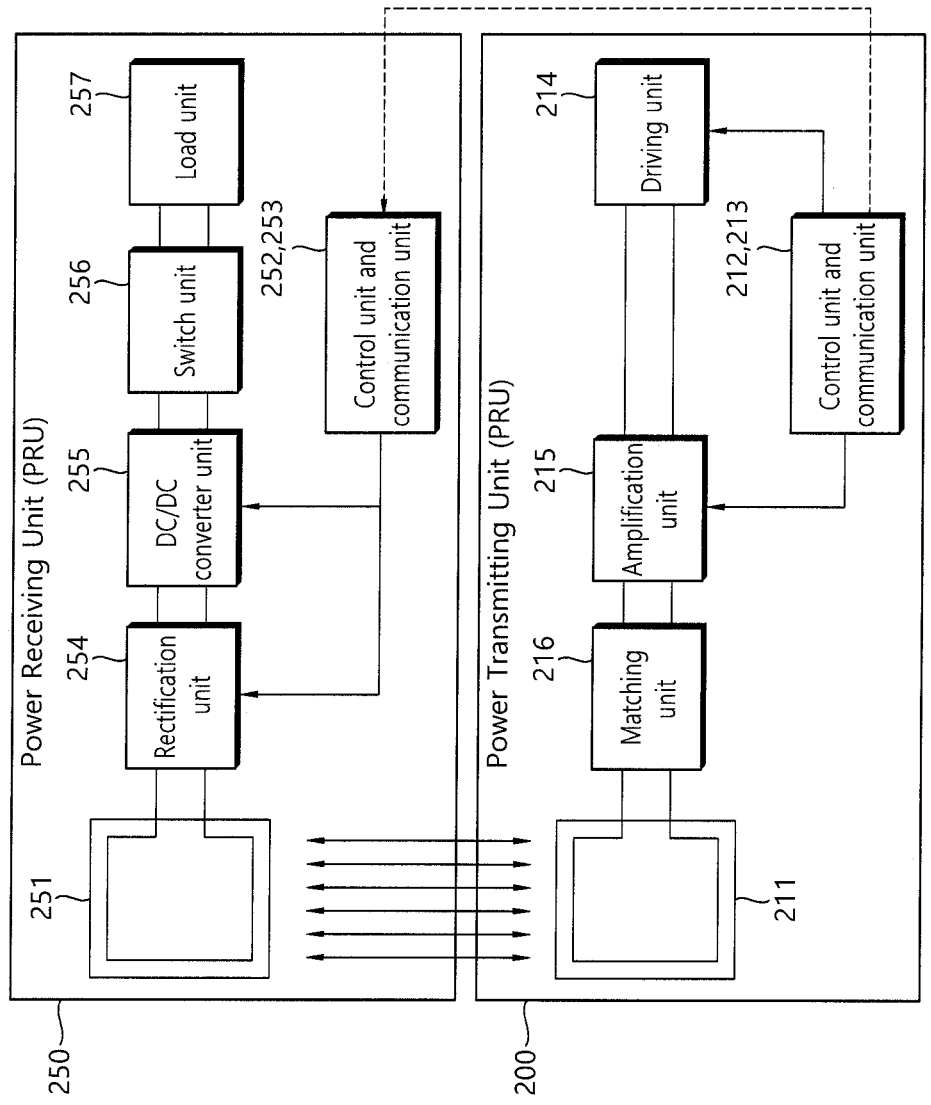
FIG. 3 is a detailed block diagram of the wireless power transmitter and the wireless power receiver according to an embodiment of the present invention.

Furthermore, in FIG. 2, the configurations of the wireless power transmitter 200 and the wireless power receiver 250 have been illustrated in brief, but FIG. 3 illustrates detailed configurations of the wireless power transmitter 200 and the wireless power receiver 250 and a detailed description thereof is given later.

FIG. 3 is a detailed block diagram of the wireless power transmitter and the wireless power receiver according to an embodiment of the present invention.

Referring to FIG. 3, the wireless power transmitter 200 may include the power transmission unit 211, the control unit and communication unit 212, 213, a driving unit 214, an amplification unit 215 and a matching unit 216. The wireless power receiver 250 may include the power reception unit 251, the control unit and communication unit 252, 253, a rectification unit 254, a DC/DC converter unit 255, a switch unit 256 and a load unit 257.

The driving unit 214 may output DC power having a preset voltage value. The voltage value of the DC power output by the driving unit 214 may be controlled by the control unit and communication unit 212, 213.

A DC current output by the driving unit 214 may be output to the amplification unit 215. The amplification unit 215 may amplify the DC current to a preset gain. Furthermore, the amplification unit 215 may convert DC power into an AC based on a signal received from the control unit and communication unit 212, 213. Accordingly, the amplification unit 215 may output AC power.

The matching unit 216 may perform impedance matching. For example, the matching unit 216 may control output power so that it becomes high efficiency or high output by adjusting impedance viewed from the matching unit 216. The matching unit 216 may adjust impedance based on control of the control unit and communication unit 212, 213. The matching unit 216 may include at least one of a coil and a capacitor. The control unit and communication unit 212, 213 may control a connection state with at least one of the coil and the capacitor. Accordingly, impedance matching may be performed.

The power transmission unit 211 may transmit input AC power to the power reception unit 251. The power transmission unit 211 and the power reception unit 251 may be implemented using resonant circuits having the same resonant frequency. For example, the resonant frequency may be determined to be 6.78 MHz. The control unit and communication unit 212, 213 may perform communication with the control unit and communication unit 252, 253 of the wireless power receiver 250.

Meanwhile, the power reception unit 251 may receive charging power from the power transmission unit 211.

The rectification unit 254 may rectify wireless power, received by the power reception unit 251, in a DC form and may be implemented in the form of a bridge diode, for example. The DC/DC converter unit 255 may convert the rectified power into a preset gain. For example, the DC/DC converter unit 255 may convert the rectified power so that the voltage of an output terminal 259 becomes 5 V. Meanwhile, a minimum value and maximum value of a voltage that may be applied to the front end 258 of the DC/DC converter unit 255 may be previously set.

The switch unit 256 may connect the DC/DC converter unit 255 and the load unit 257. The switch unit 256 may maintain its ON/OFF state under control of the control unit 252. The load unit 257 may store converted power received from the DC/DC converter unit 255 if the switch unit 256 is the ON state.

Figure 4:
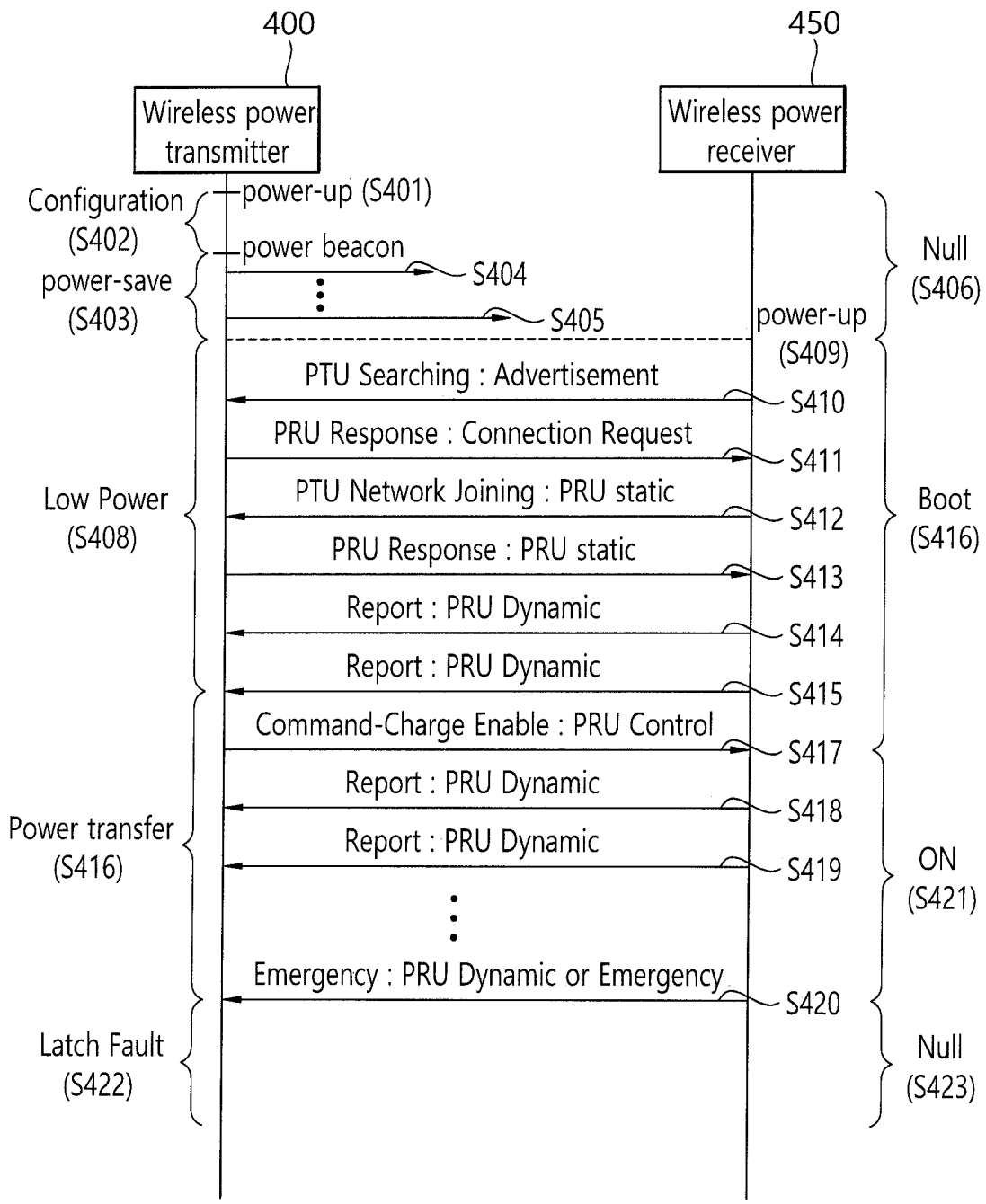
FIG. 4 is a flowchart for illustrating an operation of a wireless power transmitter and a wireless power receiver according to an embodiment of the present invention.

FIG. 4 is a flowchart for illustrating an operation of a wireless power transmitter and a wireless power receiver according to an embodiment of the present invention.

Referring to FIG. 4, the wireless power transmitter 400 may apply power (S401). When the power is applied, the wireless power transmitter 400 may configure an environment (S402).

The wireless power transmitter 400 may enter a power save mode (S403). In the power save mode, the wireless power transmitter 400 may apply heterogeneous power beacons 404 and 405 for detection in respective cycles. For example, as shown in FIG. 4, the wireless power transmitter 400 may apply the power beacons for detection. The power values of the power beacons 404 and 405 for detection may have different sizes. Some or all of the power beacons 404 and 405 for detection may have the amount of power and an application time which can drive the communication unit of a wireless power receiver 450. For example, the wireless power receiver 450 may perform communication with the wireless power transmitter 400 by driving its communication unit by some or all of the power beacons 404 and 405 for detection. The state may be called a null state.

The wireless power transmitter 400 may detect a change of a load attributable to the disposition of the wireless power receiver 450. The wireless power transmitter 400 may enter a low power mode (S409). The low power mode may be a mode in which the wireless power transmitter applies detection power periodically or aperiodically. Meanwhile, the wireless power receiver 450 may drive the communication unit based on power received from the wireless power transmitter 400 (S409).

The wireless power receiver 450 may transmit a power transmitter unit (PTU) searching signal to the wireless power transmitter 400 (S410). The wireless power receiver 450 may transmit the PTU searching signal as a BLE-based advertisement signal. The wireless power receiver 450 may transmit the PTU searching signal periodically or aperiodically or may transmit the PTU searching signal until it receives a power receiver unit (PRU) response signal from the wireless power transmitter 400 or a predetermined time is reached.

When the PTU searching signal is received from the wireless power receiver 450, the wireless power transmitter 400 may transmit a PRU response signal (S411). In this case, the PRU response signal may establish connection between the wireless power transmitter 400 and the wireless power receiver 450.

The wireless power receiver 450 may transmit a PRU static signal (S412). In this case, the PRU static signal may be a signal indicative of the state of the wireless power receiver 450, and may request to join a wireless power network controlled by the wireless power transmitter 400.

The wireless power transmitter 400 may transmit a PTU static signal (S413). The PTU static signal transmitted by the wireless power transmitter 400 may be a signal indicative of the capability of the wireless power transmitter 400.

When the wireless power transmitter 400 and the wireless power receiver 450 transmit and receive the PRU static signal and the PTU static signal, the wireless power receiver 450 may periodically transmit a PRU dynamic signal (S414, S415).

The PRU dynamic signal may include at least one piece of parameter information measured by the wireless power receiver 450. For example, the PRU dynamic signal may include information about a voltage at the rear end of the rectification unit of the wireless power receiver 450. The state of the wireless power receiver 450 may be called a boot state.

The wireless power transmitter 400 may enter a power transfer mode (S416). The wireless power transmitter 400 may transmit a PRU command signal, that is, a command signal that enables the wireless power receiver 450 to perform charging (S417). In the power transfer mode, the wireless power transmitter 400 may transmit charging power.

The PRU command signal transmitted by the wireless power transmitter 400 may include information that enables or disables the charging of the wireless power receiver 450 and permission information. The PRU command signal may be transmitted if the wireless power transmitter 400 changes the state of the wireless power receiver 450 or in a predetermined cycle (e.g., a cycle of 250 ms). The wireless power receiver 400 may change its configuration in response to the PRU command signal, and may transmit a PRU dynamic signal for reporting the state of the wireless power receiver 450 (S418, S419). The PRU dynamic signal transmitted by the wireless power receiver 450 may include at least one of a voltage, a current, a wireless power receiver state and temperature information. The state of the wireless power receiver 450 may be called an ON state.

The wireless power receiver 450 may receive the PRU command signal and perform charging. For example, if the wireless power transmitter 400 has power enough to charge the wireless power receiver 450, it may transmit the PRU command signal that enables charging. Meanwhile, the PRU command signal may be transmitted whenever a charging state is changed. The PRU command signal may be transmitted every 250 ms, for example, or may be transmitted when there is a change of a parameter. The PRU command signal may be set so that it is transmitted on a predetermined critical time (e.g., within one second) although the parameter is not changed.

Meanwhile, the wireless power receiver 450 may detect the generation of an error. The wireless power receiver 450 may transmit a warning signal to the wireless power transmitter 400 (S420). The warning signal may be transmitted as a PRU dynamic signal or may be transmitted as a PRU warning signal. For example, the wireless power receiver 450 may incorporate an error situation into a PRU warning information field of Table 4 and transmit the error situation to the wireless power transmitter 400. Alternatively, the wireless power receiver 450 may transmit a sole warning signal indicative of an error situation to the wireless power transmitter 400. When the wireless power transmitter 400 receives the PRU warning signal, it may enter a latch fault mode (S422). The wireless power receiver 450 may enter a null state (S423).

Figure 5:
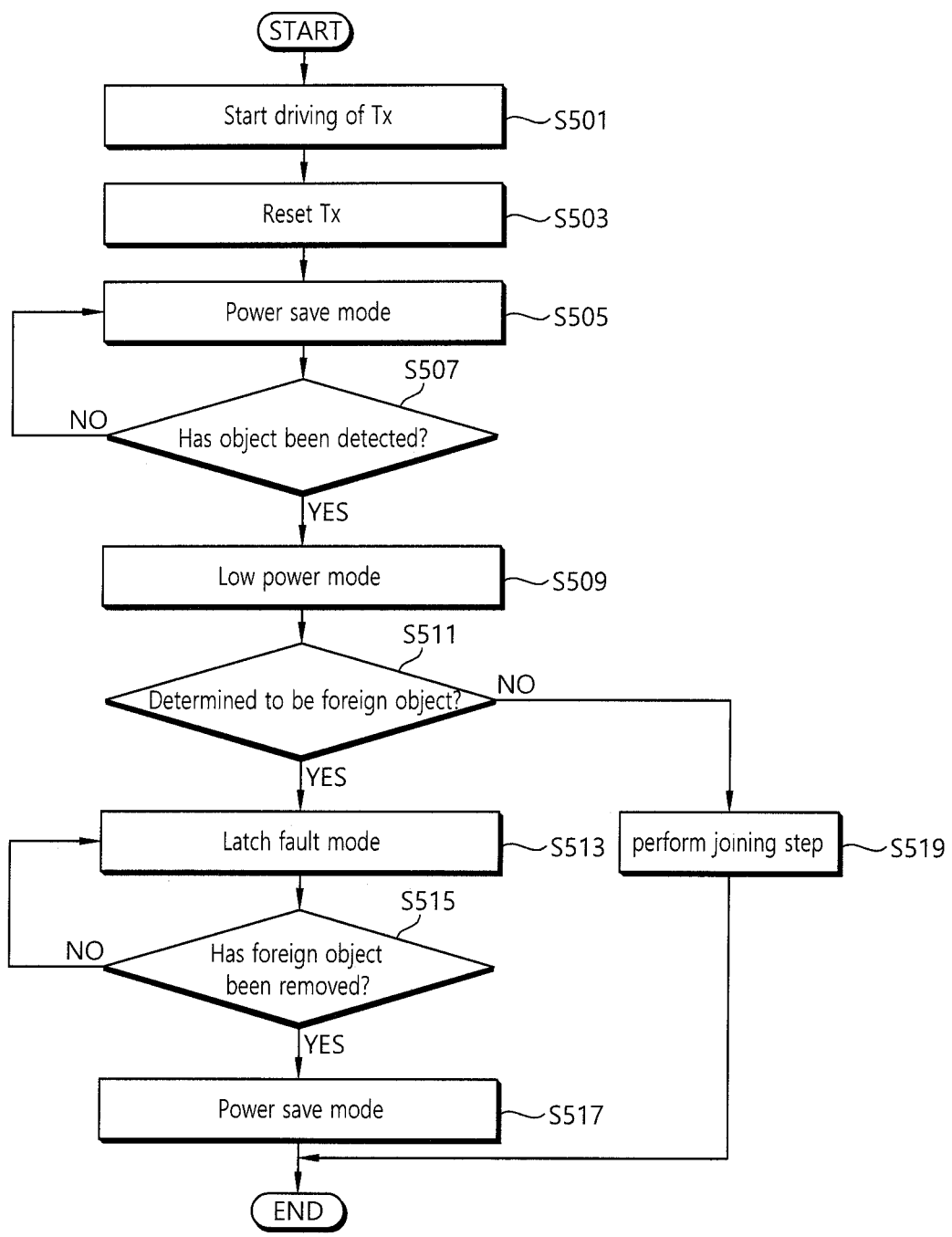
FIG. 5 is a flowchart illustrating an operation of the wireless power transmitter and the wireless power receiver according to another embodiment of the present invention.

FIG. 5 is a flowchart illustrating an operation of the wireless power transmitter and the wireless power receiver according to another embodiment of the present invention.

Figure 6:
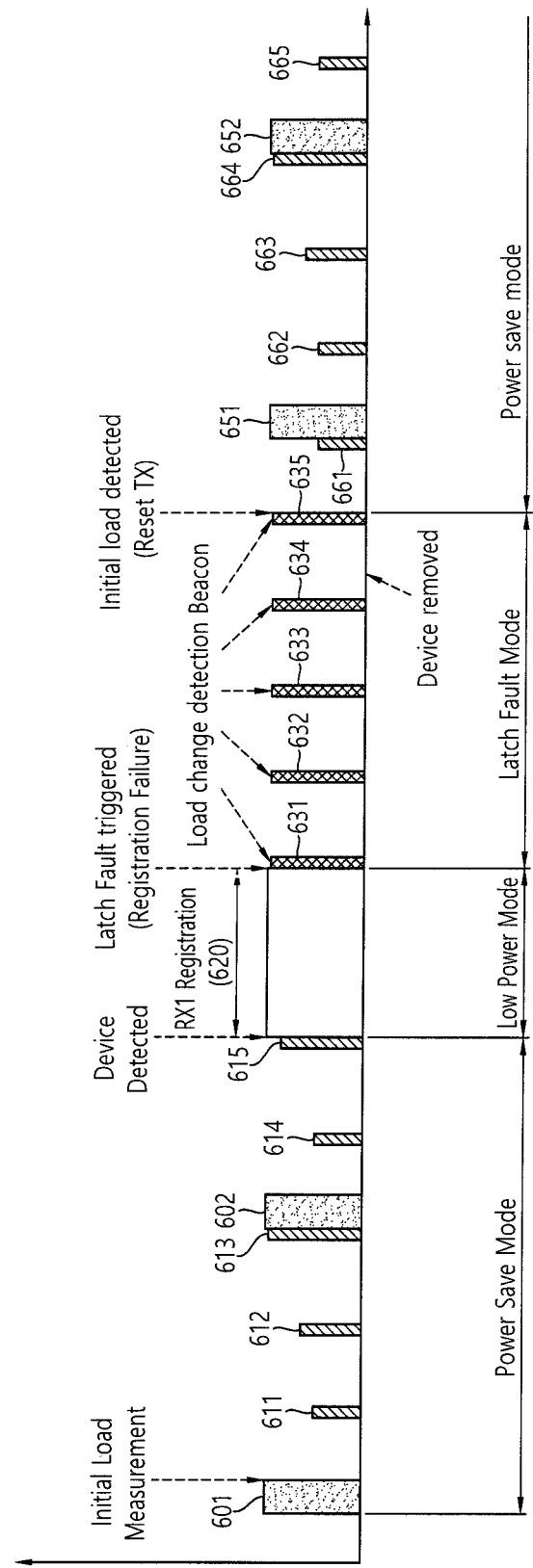
FIG. 6 is a graph for the time axis of the amount of power applied by the wireless power transmitter of FIG. 5 according to an embodiment.

The control method of FIG. 5 is described in more detail with reference to FIG. 6. FIG. 6 is a graph for the time axis of the amount of power applied by the wireless power transmitter of FIG. 5 according to an embodiment.

Referring to FIG. 5, the wireless power transmitter may start driving (S501). Furthermore, the wireless power transmitter may reset initial setting (S503). The wireless power transmitter may enter the power save mode (S505). In this case, the power save mode may be a section in which the wireless power transmitter applies heterogeneous power having a different amount of power to the power transmission unit. For example, the wireless power transmitter may be a section in which second detection power 601 and 602 and third detection power 611, 612, 613, 614 and 615 are applied to the power transmission unit in FIG. 6. In this case, the wireless power transmitter may periodically apply the second detection power 601 and 602 in a second cycle. If the second detection power 601 and 602 is applied, the wireless power transmitter may apply the second detection power 601 and 602 during a second period.

The wireless power transmitter may periodically apply the third detection power 611, 612, 613, 614 and 615 in a third cycle. If the third detection power 611, 612, 613, 614 and 615 is applied, the wireless power transmitter may apply the third detection power 611, 612, 613, 614 and 615 during a third period. Meanwhile, the third detection power 611, 612, 613, 614 and 615 has been illustrated as having different power values, but the power values of the third detection power 611, 612, 613, 614 and 615 may be different or the same.

The wireless power transmitter may output the third detection power 612 having the same amount of power after it outputs the third detection power 611. If the wireless power transmitter outputs the third detection power having the same amount of power as described above, the amount of power of the third detection power may have the amount of power capable of detecting the smallest wireless power receiver, for example, the wireless power receiver of a category 1.

The wireless power transmitter may output the third detection power 612 having the amount of power having the upper limit size after it outputs the third detection power 611. If the wireless power transmitter outputs the pieces of third detection power having different sizes, the amounts of power of the pieces of third detection power may be the amounts of power capable of detecting the wireless power receivers of categories 1 to 5, respectively. For example, the third detection power 611 may have the amount of power capable of detecting the wireless power receiver of the category 5. The third detection power 612 may have the amount of power capable of detecting the wireless power receiver of the category 3. The third detection power 613 may have the amount of power capable of detecting the wireless power receiver of the category 1.

Meanwhile, the second detection power 601 and 602 may be power capable of driving a wireless power receiver. More specifically, the second detection power 601 and 602 may have the amount of power capable of driving the control unit and communication unit of the wireless power receiver.

The wireless power transmitter may apply the second detection power 601 and 602 and the third detection power 611, 612, 613, 614 and 615 to the power reception unit in the second cycle and the third cycle, respectively. If a wireless power receiver is disposed on the wireless power transmitter, impedance viewed from one point of the wireless power transmitter may be changed. The wireless power transmitter may detect a change in the impedance while the second detection power 601 and 602 and the third detection power 611, 612, 613, 614 and 615 are applied. For example, the wireless power transmitter may detect a change in the impedance while it applies the third detection power 615. Accordingly, the wireless power transmitter may detect an object (S507). If an object is not detected (S507-N), the wireless power transmitter may maintain power save mode in which heterogeneous power is periodically applied (S505).

Meanwhile, if impedance is changed and an object is detected (S507-Y), the wireless power transmitter may enter the low power mode. In this case, the low power mode is a mode in which the wireless power transmitter applies driving power having the amount of power capable of driving the control unit and communication unit of a wireless power receiver. For example, as shown in FIG. 6, the wireless power transmitter may apply driving power 620 to the power transmission unit. The wireless power receiver may receive the driving power 620 and drive the control unit and communication unit. The wireless power receiver may perform communication with the wireless power transmitter using the driving power 620 based on a specific method. For example, the wireless power receiver may transmit or receive data required for authentication, and may join a wireless power network controlled by the wireless power transmitter based on the data. In this case, if a foreign object other than a wireless power receiver is disposed, data transmission or reception cannot be performed. Accordingly, the wireless power transmitter may determine whether the disposed object is a foreign object (S511). For example, if the wireless power transmitter does not receive a response from the object during a predetermined time, it may determine the object to be a foreign object.

If the disposed object is determined to be a foreign object (S511-Y), the wireless power transmitter may enter the latch fault mode. For example, the wireless power transmitter may periodically apply first power 631 to 634 in a first cycle in FIG. 6. The wireless power transmitter may detect a change in the impedance while it applies the first power. For example, if the foreign object is removed, the wireless power transmitter may detect a change in the impedance. The wireless power transmitter may determine that the foreign object has been removed. Alternatively, if the foreign object has not been removed, the wireless power transmitter is unable to detect a change in the impedance. The wireless power transmitter may determine that the foreign object has not been removed. If the foreign object has not been removed, the wireless power transmitter may notify a user that the current state of the wireless power transmitter is an error state by outputting at least one of a lamp and a warning sound. Accordingly, the wireless power transmitter may include an output unit which outputs at least one of the lamp and the warning sound.

If it is determined that the foreign object has not been removed (S515-N), the wireless power transmitter may maintain the latch fault mode (S513). Meanwhile, if it is determined that the foreign object has been removed (S515-Y), the wireless power transmitter may enter the power save mode again (S517). For example, the wireless power transmitter may apply second power 651 and 652 and third power 661 to 665.

Meanwhile, in the case of FIGS. 5 and 6, if a change in the impedance attributable to the disposition of a wireless power receiver is not great, it may be difficult to detect a wireless power receiver.

Figure 7:
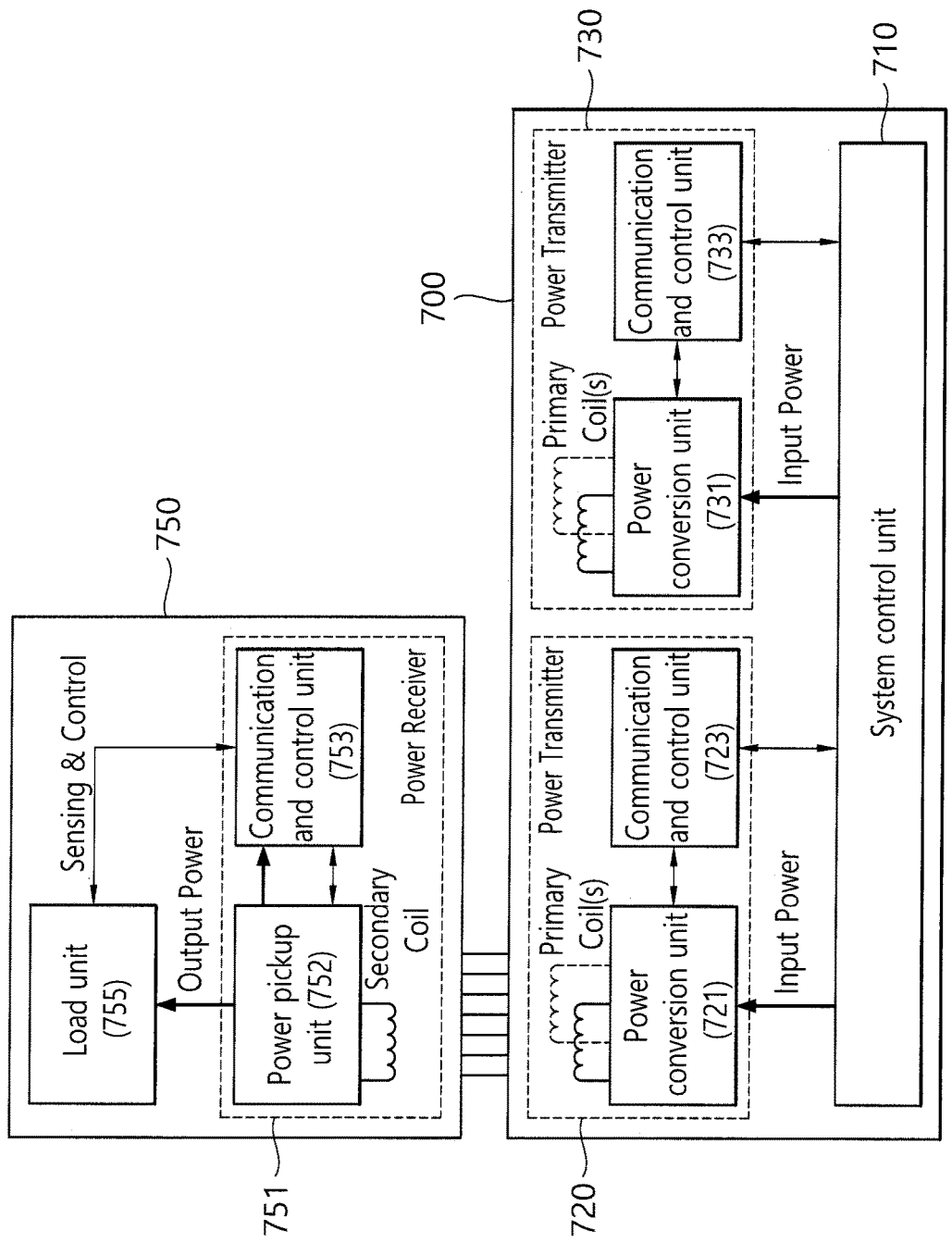
FIG. 7 is a block diagram of a wireless power transmitter and a wireless power receiver according to another embodiment of the present invention.

FIG. 7 is a block diagram of a wireless power transmitter and a wireless power receiver according to another embodiment of the present invention.

Referring to FIG. 7, the wireless power transmitter 700 may include a system control unit 710 and one or more power transmission units 720 and 730. The power transmission units 720 and 730 may include power conversion units 721 and 731 and communication and control units 723 and 733. Furthermore, the wireless power receiver 750 may include a power reception unit 751 and a load unit 755. The power reception unit 751 may include a power pickup unit 752 and a communication and control unit 753.

Each of the power conversion units 721 and 731 may convert electrical power into wireless power, and may transmit the wireless power to the power pickup unit 752 included in the reception unit 751 of the at least one wireless power receiver 750. Each of the power conversion units 721 and 731 may include a primary coil of the magnetic induction method for transmitting wireless power.

The power pickup unit 752 may receive the wireless power from the power conversion units 721 and 731 and convert the received wireless power into electrical power. The power pickup unit 752 may include a secondary coil of the magnetic induction method for receiving wireless power. For example, the power conversion units 721 and 731 and the power pickup unit 752 may maintain the primary coil and the secondary coil in at least one state of a horizontal alignment state and a vertical alignment state, and may transmit or receive wireless power. The primary coil may be a wire-wound type coil, may be a coil array including at least one coil, and may form a coreless resonant transformer part along with a secondary coil.

Meanwhile, the wireless power transmitter 700 may further include an interface surface (not shown) of a flat surface form in order to send wireless power. The at least one wireless power receiver 750 may be placed over the interface surface, and the primary coil may be provided under the interface surface. In this case, small vertical spacing may be formed between the primary coil disposed under the interface surface and the secondary coil of the wireless power receiver 750 disposed over the interface surface so that induction coupling is performed between the primary coil and the secondary coil. The primary coil is described in detail below.

Figure 8:
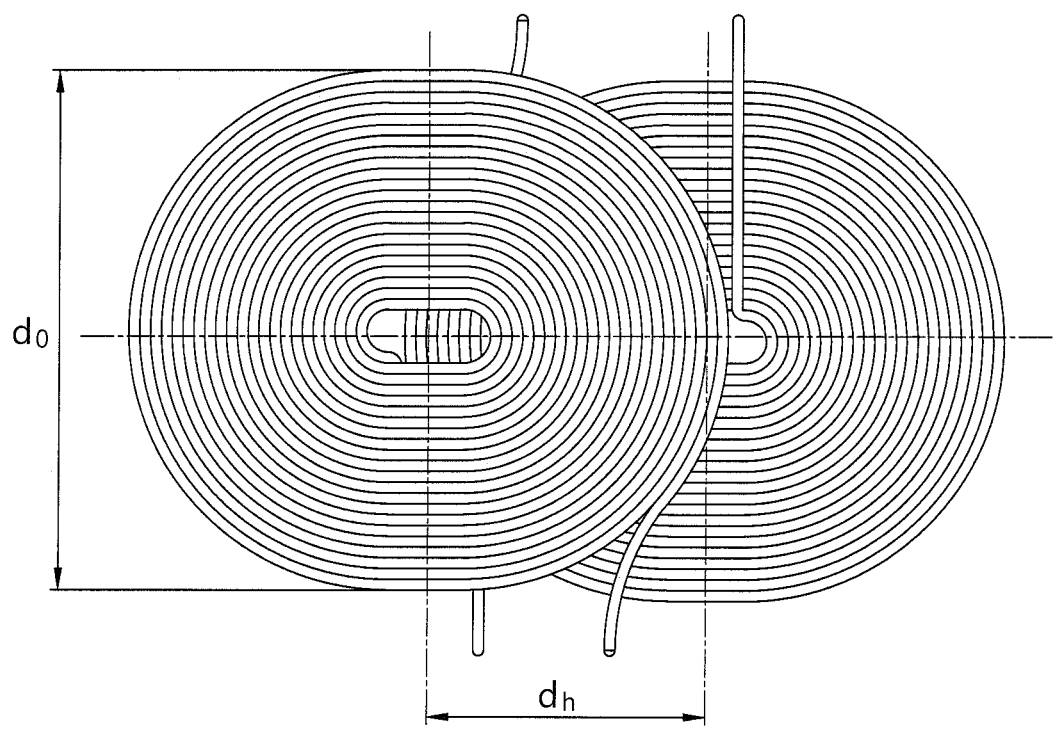
FIG. 8 is a diagram showing an example in which two primary coils are configured.
Figure 9:
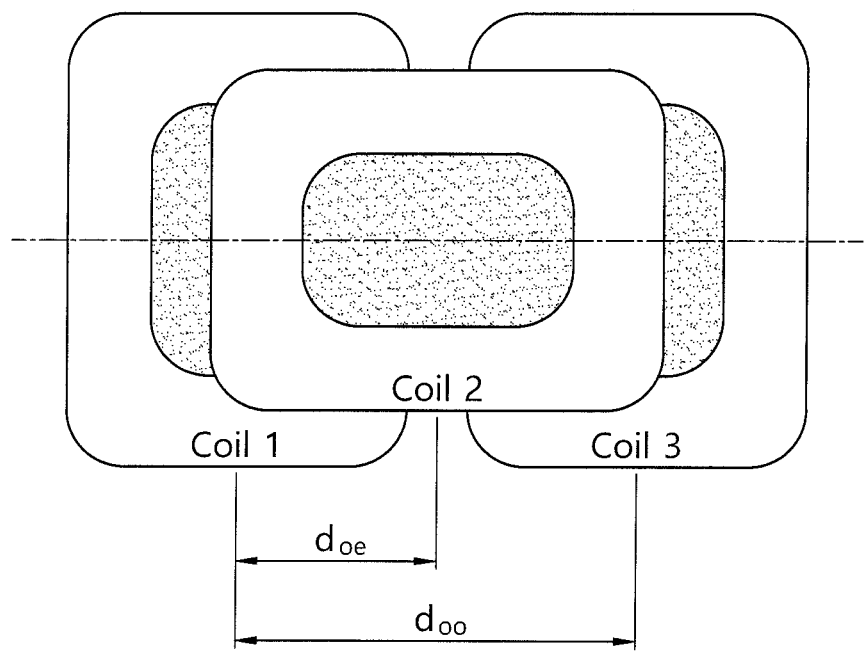
FIG. 9 is a diagram showing an example in which three primary coils are configured.

FIG. 8 is a diagram showing an example in which two primary coils are configured. FIG. 9 is a diagram showing an example in which three primary coils are configured.

Referring to FIG. 8, the two primary coils may be wire-wound type coils. The wire-wound type coil may include a Litz wire having 115 stands and a diameter of 0.08 mm. Furthermore, the two primary coils may have a Racetrack-like shape and may include a single layer. Furthermore, the parameters of the two primary coils may include $d_o$ and $d_h$. $d_o$ may be the external diameter of the primary coil, and do may be the distance between the centers of the two primary coils.

Referring to FIG. 9, the three primary coils may include a Litz wire having 105 stands and a diameter of 0.08 mm. Furthermore, the three primary coils may have a rectangular shape and may include a single layer. Furthermore, the parameters of the three primary coils may include $d_{oe}$ and $d_{oo}$. $d_{oe}$ may be the distance between the center of a first primary coil and the center of a second primary coil, and $d_{oo}$ may be the distance between the center of the first primary coil and the center of a third primary coil.

Referring back to FIG. 7, the communication and control unit 723, 733 may perform communication with the at least one power reception unit 752. Furthermore, the communication and control unit 723, 733 may receive a request message for required wireless power from the power reception unit 752. Accordingly, the communication and control unit 723, 733 may control the power conversion unit 721 so that the requested wireless power is transmitted to the power reception unit 752.

The power pickup unit 752 may receive the wireless power from the power conversion unit 721. The load unit 755 may load the received wireless power and charge the battery with the loaded wireless power. The communication and control unit 753 may perform communication with the transmission unit 720, 730 and may perform control so that the wireless power is received from the transmission unit 720, 730. A detailed configuration of the power transmission unit 720, 730 is described below with reference to FIG. 10.

Figure 10:
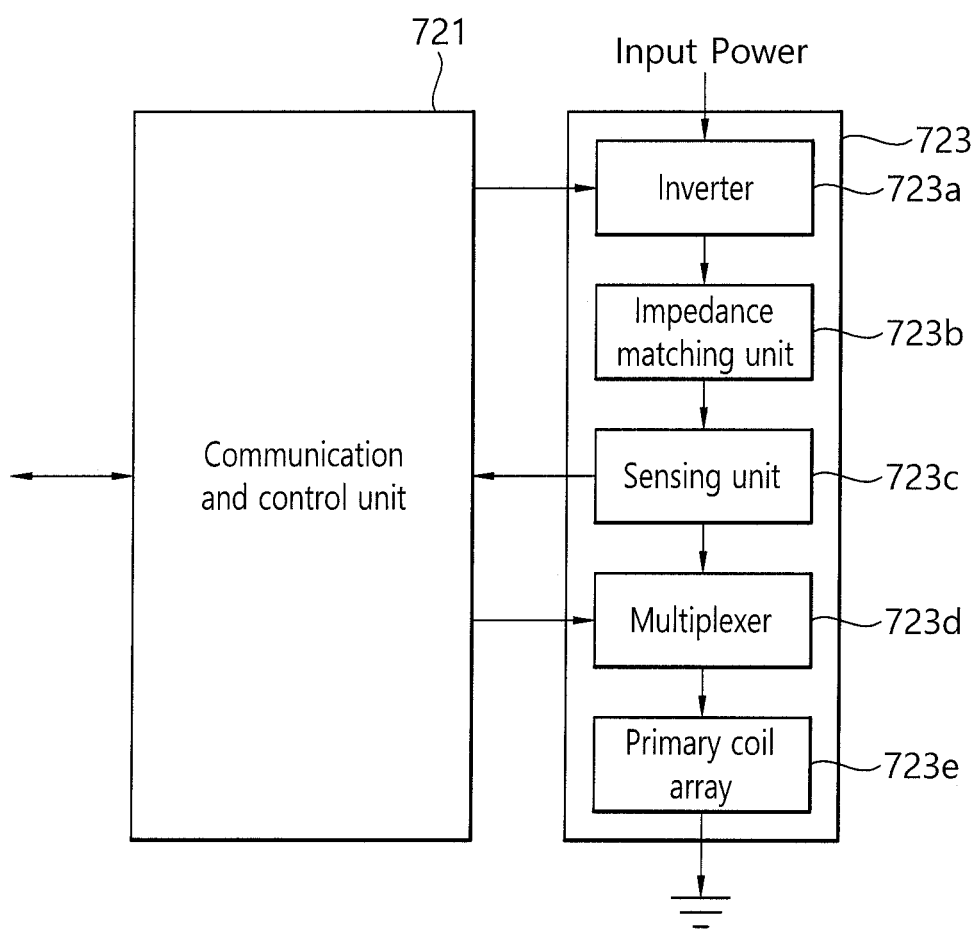
FIG. 10 is a detailed block diagram of the power transmission unit of the wireless power transmitter of FIG. 7 according to an embodiment.

FIG. 10 is a detailed block diagram of the power transmission unit of the wireless power transmitter of FIG. 7 according to an embodiment.

Referring to FIG. 10, the power transmission unit 720, 730 may include the communication and control unit 721 and the power conversion unit 723. The power conversion unit 723 may include an inverter 723a, an impedance matching unit 723b, a sensing unit 723c, a multiplexer 723d and a primary coil array 723e.

In the power conversion unit 723, the inverter 723a may convert digital current (DC) input into an analog current (AC) waveform. The impedance matching unit 723b may perform matching so that a resonant circuit and the primary coil array 723e are connected. Furthermore, the sensing unit may monitor current and a voltage by sensing the current and voltage between the resonant circuit and the primary coil array 723e. The multiplexer 723d may connect or may not connect proper primary coils depending on the location of the power receiver 751.

The communication and control unit 721 may receive a request message for wireless power from the power receiver 751, and may control connection with a proper primary coil array through the multiplexer 723d. Furthermore, the communication and control unit 721 may control the inverter 723a so that the amount of wireless power is adjusted by executing a power control algorithm and protocol, and may control the primary coil array 723e so that the wireless power is transmitted to the power receiver 751. The primary coil array 723e of the power transmission unit 720, 730 is described below with reference to FIG. 11.

FIG. 11 is a diagram showing an example in which the primary coil array of the power transmission unit is configured.

In FIG. 11, (a) is an example showing the top monolayer of a primary coil layer, (b) is an example showing one side of the primary coil array, and (c) is an example showing the top monolayer of the primary coil array.

A primary coil may have a circular shape and a single layer, and the primary coil array may have a plurality of primary coil layers including the area of a hexagonal lattice.

Referring to FIG. 11, the parameters of the primary coil array may include $d_o$, $d_i$, $d_c$, $d_a$, $d_h$, $t_2$ and $t_3$. $d_o$ may indicate the external diameter of the primary coil layer, $d_i$ may indicate the internal diameter of the primary coil layer, $d_c$ may indicate the thickness of the primary coil array, $d_a$ may indicate the thickness of the primary coil array, $d_h$ may indicate the distance between the centers of neighboring primary coil layers, $t_2$ may indicate the offset of a second primary coil layer array, and $t_3$ may indicate the offset of a third primary coil layer array.

Referring back to FIG. 7, the system control unit 710 may control wireless power transmission with the at least one wireless power receiver 750. Accordingly, the wireless power transmitter 700 may transmit wireless power to a plurality of wireless power receivers (not shown). The system control unit 710 which performs the control operation of the wireless power transmitter 700 is described below in detail with reference to FIG. 12.

Figure 12:
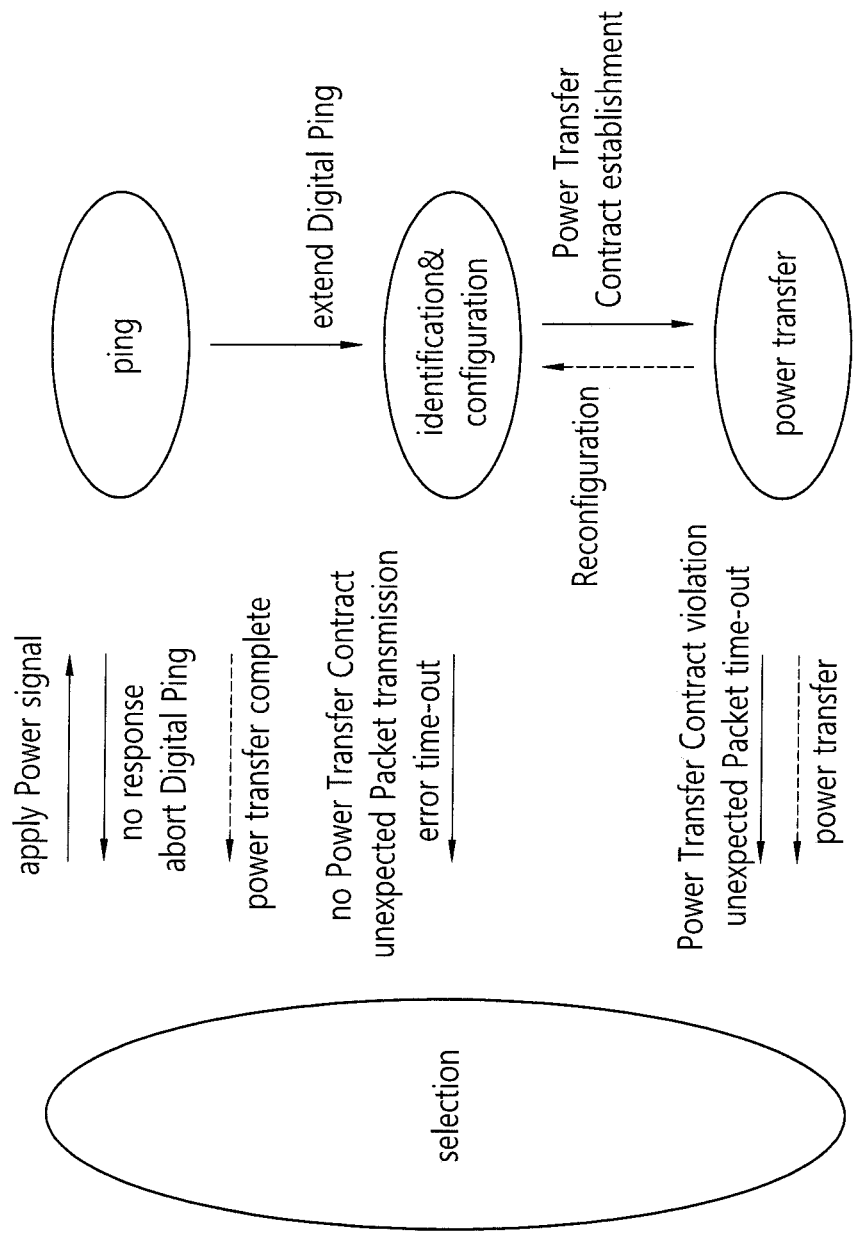
FIG. 12 is a flowchart for illustrating the control operation of the wireless power transmitter.

FIG. 12 is a flowchart for illustrating the control operation of the wireless power transmitter.

Referring to FIG. 12, the control operation of the wireless power transmitter may include a selection step, a ping step, an identification and configuration step, and a power transfer step.

In the selection step, the interface surface for the location and removal of a wireless power receiver may be monitored. For example, in the selection step, at least one wireless power receiver present in a free location may be discovered and monitored. An object (e.g., a foreign object, a key or a coin) other than a wireless power receiver may be identified.

Furthermore, if information about a wireless power receiver is insufficient, in the selection step, related information may be selected by repeatedly performing the ping step and the identification and configuration step. Furthermore, in the selection step, a primary coil that will transfer wireless power to a wireless power receiver may be selected. Furthermore, the selection step may switch to a standby mode if a primary coil is not selected.

In the ping step, digital ping may be executed, and the ping step may wait so that a response to a wireless power receiver is received. Furthermore, in the ping step, if a wireless power receiver is discovered, digital ping may be extended and a level of the digital ping may be maintained. Furthermore, if the digital ping is not extended, the ping step may return back to the selection step.

In the identification and configuration step, a selected wireless power receiver may be identified, and wireless power amount configuration information requested by the wireless power receiver may be obtained. Furthermore, in the identification and configuration step, the extended digital ping may be set so that it is terminated. In order to discover another wireless power receiver, the identification and configuration step may return to the selection step.

In the power transfer step, the requested amount of wireless power may be transmitted to the identified wireless power receiver, and current of the primary coil may be adjusted based on control data. Furthermore, when the transmission of the requested amount of wireless power to the identified wireless power receiver is completed, in the power transfer step, the transmission of the wireless power to the identified wireless power receiver may be stopped.

Figure 13:
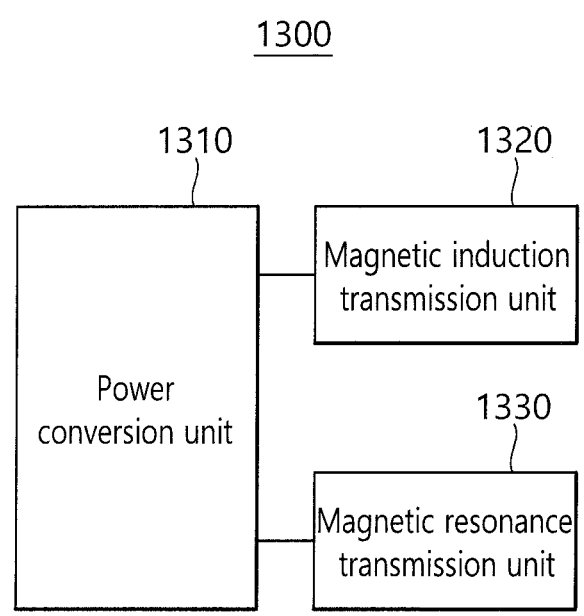
FIG. 13 is a diagram for illustrating the configuration of the power transmission unit according to an embodiment.

FIG. 13 is a diagram for illustrating the configuration of a power transmission unit according to an embodiment.

The power transmission unit 1300 shown in FIG. 13 may include a power conversion unit 1310 including an inverter, a magnetic induction transmission unit 1320 for transmitting power according to the magnetic induction method, and a magnetic resonance transmission unit 1330 for transmitting power according to the magnetic resonance method.

The magnetic induction transmission unit 1320 and the magnetic resonance transmission unit 1330 may become on or off in a time division manner or may become on or off at the same time. Accordingly, the power transmission unit 1300 may transmit power to the wireless power reception apparatus of the magnetic induction method and the wireless power reception apparatus of the magnetic resonance method at the same time.

Figure 14:
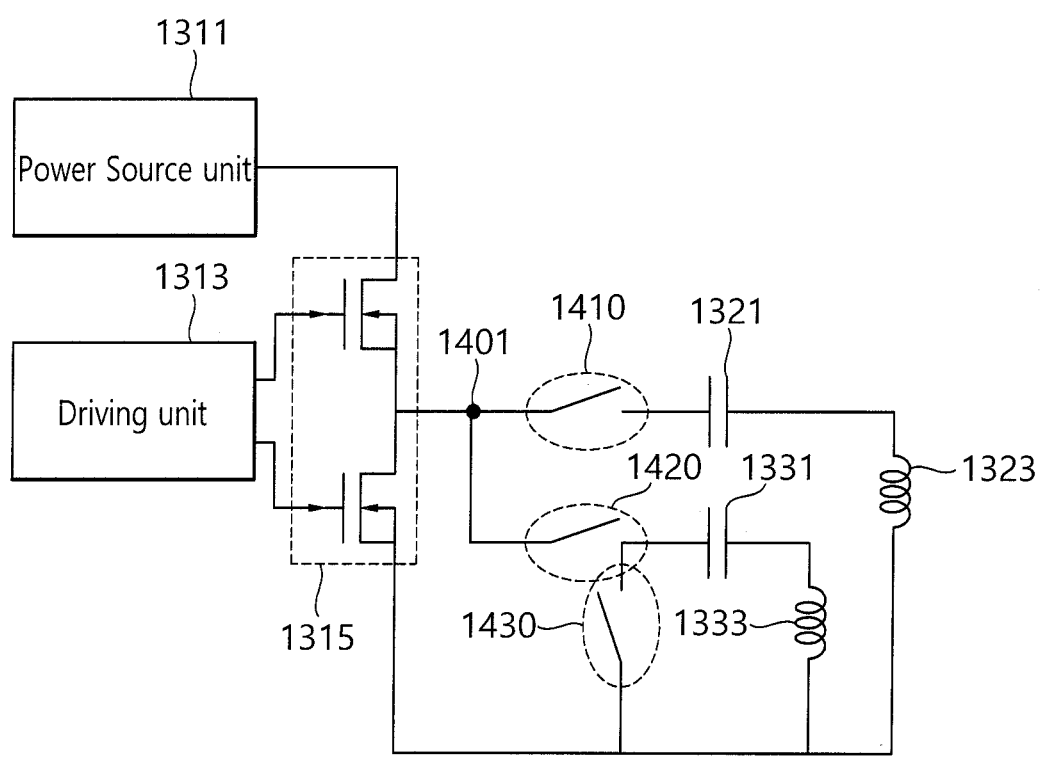
FIG. 14 is a diagram showing an example of a connection relation between the output terminal of an inverter included in the power conversion unit, a magnetic induction transmission unit and a magnetic resonance transmission unit in FIG. 13.

FIG. 14 is a diagram showing an example of a connection relation between the output terminal of the inverter included in the power conversion unit 1310, the magnetic induction transmission unit 1320 and the magnetic resonance transmission unit 1330 in FIG. 13.

Referring to FIGS. 13 and 14, the power transmission unit 1300 may operate in a magnetic induction transmission mode, a magnetic resonance transmission mode or a hybrid mode by controlling a first switch 1410, a second switch 1420 and a third switch 1430. In this case, the hybrid mode may be a mode in which power transfer using the magnetic induction method and power transfer using the magnetic resonance method are performed at the same time.

The wireless power transmission apparatus may perform communication with the wireless power reception apparatus or measure a change in the impedance in order to determine an operation mode of the power transmission unit 1300, and may operate in the hybrid mode at normal times or if the type of wireless power reception apparatus is not clear.

A power source unit 1311 applies a DC voltage to a switch unit 1315. A driving unit 1313 outputs an AC voltage to an inverter output terminal 1401 by controlling the switch unit 1315.

The magnetic induction transmission unit 1320 of FIG. 13 may include a first capacitor 1321 and a first inductor 1323.

The magnetic resonance transmission unit 1330 of FIG. 13 may include a second capacitor 1331 and a second inductor 1333.

One end of the first switch 1410 may be connected to the inverter output terminal 1401, and the other end thereof may be connected to the first capacitor 1321.

One end of the second switch 1420 may be connected to the inverter output terminal 1401, and the other end thereof may be connected to the second capacitor 1331.

In the magnetic induction transmission mode, the first switch 1410 may become on, and the second switch 1420 and the third switch 1430 may become off.

In a first magnetic resonance transmission mode, the first switch 1410 may become off and the second switch 1420 may become on.

In a second magnetic resonance transmission mode, the first switch 1410 may become on and the third switch 1430 may become on.

In this case, if the third switch 1430 becomes on, the power transmission unit 1300 always turns on the first switch and always turns off the second switch 1420.

In the magnetic resonance transmission mode, if the third switch 1430 becomes on, the second capacitor 1331 and the second inductor 1333 form a closed loop. In this case, the closed loop may be called a resonator. In the second magnetic resonance transmission mode, energy maybe induced from the first inductor 1323 to the second inductor 1333 and then transferred to the wireless power reception apparatus through the resonator.

In the second magnetic resonance transmission mode, the second capacitor 1331 and the second inductor 1333 do not affect the unique resonant frequency of the entire system because they operate as the resonator. Accordingly, in the second magnetic resonance transmission mode, energy may be transferred to the wireless power reception apparatus with higher efficiency compared to the first magnetic resonance transmission mode. Accordingly, the second switch 1320 shown in FIG. 14 may be removed.

The power transmission unit 1300 may operate in the hybrid mode by making the first switch 1410 and the second switch 1420 on or off in a time division manner. Furthermore, the power transmission unit 1300 may operate in the hybrid mode by making the third switch 1430 on or off in a time division manner in the state in which the first switch 1410 becomes always on.

Meanwhile, in FIG. 14, the first capacitor 1321 and the first inductor 1323 may be the equivalent circuits of an induction coil, and may be respectively called first capacitance and second inductance. Likewise, the second capacitor 1331 and the second inductor 1333 may be the equivalent circuits of a resonant coil, and may be respectively called second capacitance and second inductance.

Figure 15:
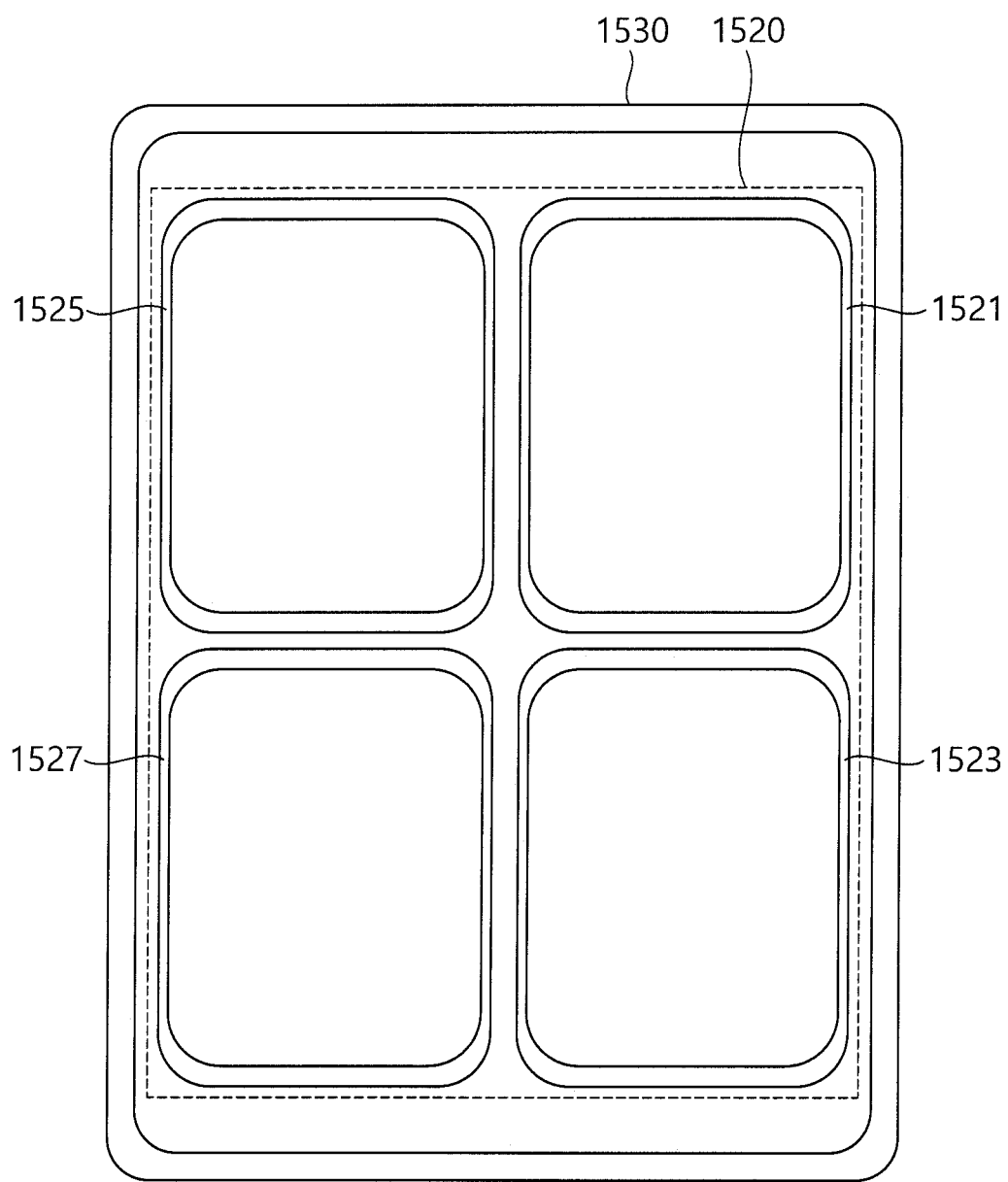
FIG. 15 shows an example of the configuration of the magnetic induction transmission unit and the magnetic resonance transmission unit of FIG. 13.

FIG. 15 shows an example of the configuration of the magnetic induction transmission unit 1320 and the magnetic resonance transmission unit 1330 of FIG. 13.

Referring to FIG. 15, the magnetic induction transmission unit 1320 may include a single coil or a coil array 1520, and the magnetic resonance transmission unit 1330 may include a resonant coil 1530 of a form that surrounds the coil array 1520.

The coil array 1520 may include a plurality of coil cells 1521, 1523, 1525 and 1527. The coil array 1520 may include a plurality of primary coils configured as in FIG. 9 or 11.

In the magnetic induction transmission mode, only some or all of the plurality of coil cells may become on depending on the required amount of power of the wireless power reception apparatus.

Furthermore, if the coil array 1520 includes a plurality of coil cells, only some or all of the plurality of coil cells may become on depending on the required amount of power of the wireless power reception apparatus in the second magnetic resonance transmission mode.

Figure 16:
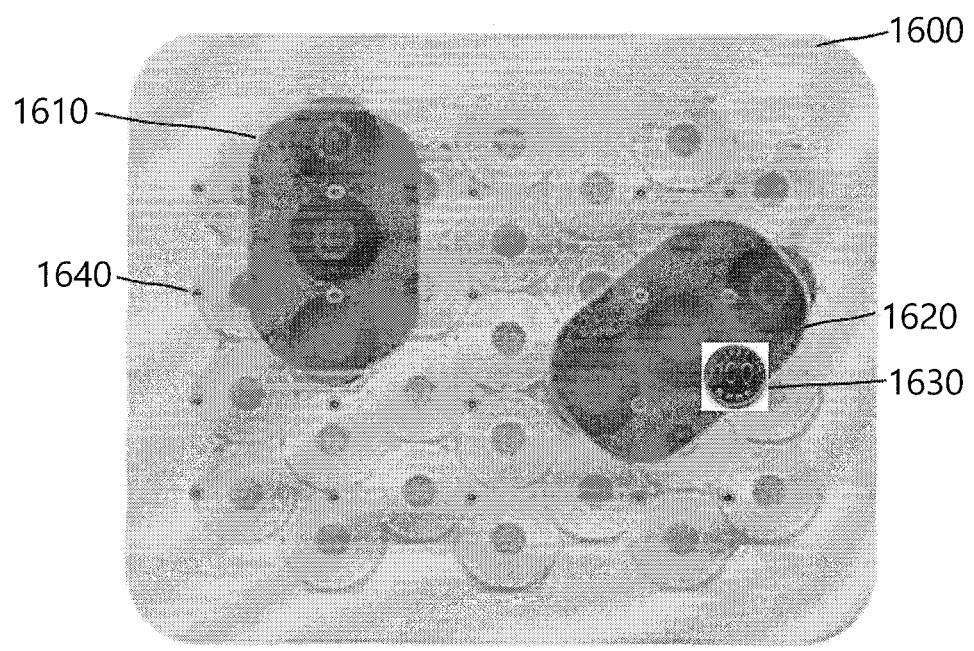
FIG. 16 is a diagram for illustrating a method for controlling the primary coil array of FIG. 11 according to an embodiment.

FIG. 16 is a diagram for illustrating a method for controlling the primary coil array of FIG. 11 according to an embodiment.

As described with reference to FIG. 12, the wireless power transmission apparatus may operate according to the power transfer step after the identification and configuration step.

In this case, in the power transfer step, if a new wireless power receiver appears or a foreign object is present, there is a need for a method for controlling the operation of the primary coil array.

Referring to FIG. 16, the primary coil array 1600 according to an embodiment may include a plurality of primary coils and a plurality of sensors 1640.

In this case, the sensor 1640 may be a pressure sensor or may be a temperature sensor. In other words, the primary coil array 1600 may include a plurality of pressure sensors and a plurality of temperature sensors.

The sensors 1640 may be provided at a plurality of locations of the primary coil array 1600. Accordingly, the wireless power transmission apparatus may detect a new object at a specific location attributable to a change in the pressure and may detect a change in the temperature at a specific location through the sensors 1640.

For example, in the "power transfer" step of transmitting power to a first wireless power reception apparatus 1610 in a first time interval, when a new wireless power reception apparatus 1620 is located at a specific location of the primary coil array 1600, the sensing value of the pressure sensor at the corresponding location may be changed.

In this case, the wireless power transmission apparatus may stop the "power transfer" step and may operate according to the identification and configuration step again.

Meanwhile, in the "power transfer" step, a foreign object 1630 may be located on primary coils that are being driven or on primary coils that are not being driven.

At this time, the wireless power transmission apparatus may detect a rise of temperature at a specific location through a temperature sensor. If the temperature rises to a predetermined threshold or more, the wireless power transmission apparatus may stop driving by making off primary coils (e.g., four coils around the corresponding temperature sensor) that are being driven around the corresponding temperature sensor.

Furthermore, although primary coils around a temperature sensor that has detected a temperature rise are made off, if the temperature does not drop to a threshold or less or rises, the wireless power transmission apparatus may temporarily stop the operation of the entire primary coil array. Furthermore, in order to detect a foreign object, the wireless power transmission apparatus may stop the "power transfer" step and operate according to the identification and configuration step.

In one embodiment, the temperature sensors may be provided only at the three or four places of the entire primary coil array 1600. If three temperature sensors are provided, whether temperature in a cell at what location will rise to a threshold or more may be determined based on the difference between temperatures measured by the three temperature sensors.

For example, if a first temperature sensor, a second temperature sensor and a third temperature sensor are disposed in a triangle and have respective sensing values A, B and C, previously measured values may be stored in a table form based on values A-B, B-C and C-A or absolute values thereof. If the value A-B is the greatest and A is greater than B and has a value equal to or greater than a critical value by a specific value or more, primary coils around A may become off. Alternatively, if A is 25, B is 24.5 and C is 24.6, cells that belong to cells between A and C and that are located at a specific distance or more from B may be set to become off.

Meanwhile, power that may be transmitted for each of primary coils included in the primary coil array 1600 may be limited due to a temperature rise, an electromagnetic wave problem, etc. Accordingly, in order to transfer power to the wireless power reception apparatus, the wireless power transmission apparatus may determine at least one primary coil to be driven, and may start power transfer only if a maximum amount of transmitted power of the primary coil is greater than the required amount of power of the wireless power reception apparatus.

For example, the wireless power transmission apparatus may check the location and required amount of power $P_{request}$ of the wireless power reception apparatus through communication, and may calculate the amount of power $P_{sum}$ transmittable by all of the primary coils to be driven at a corresponding location. In this case, the number of primary coils to be driven may be limited to a predetermined number per one wireless power reception apparatus. The wireless power transmission apparatus may make on corresponding primary coils if $P_{sum}$ is greater than $P_{request}$.

Figure 17:
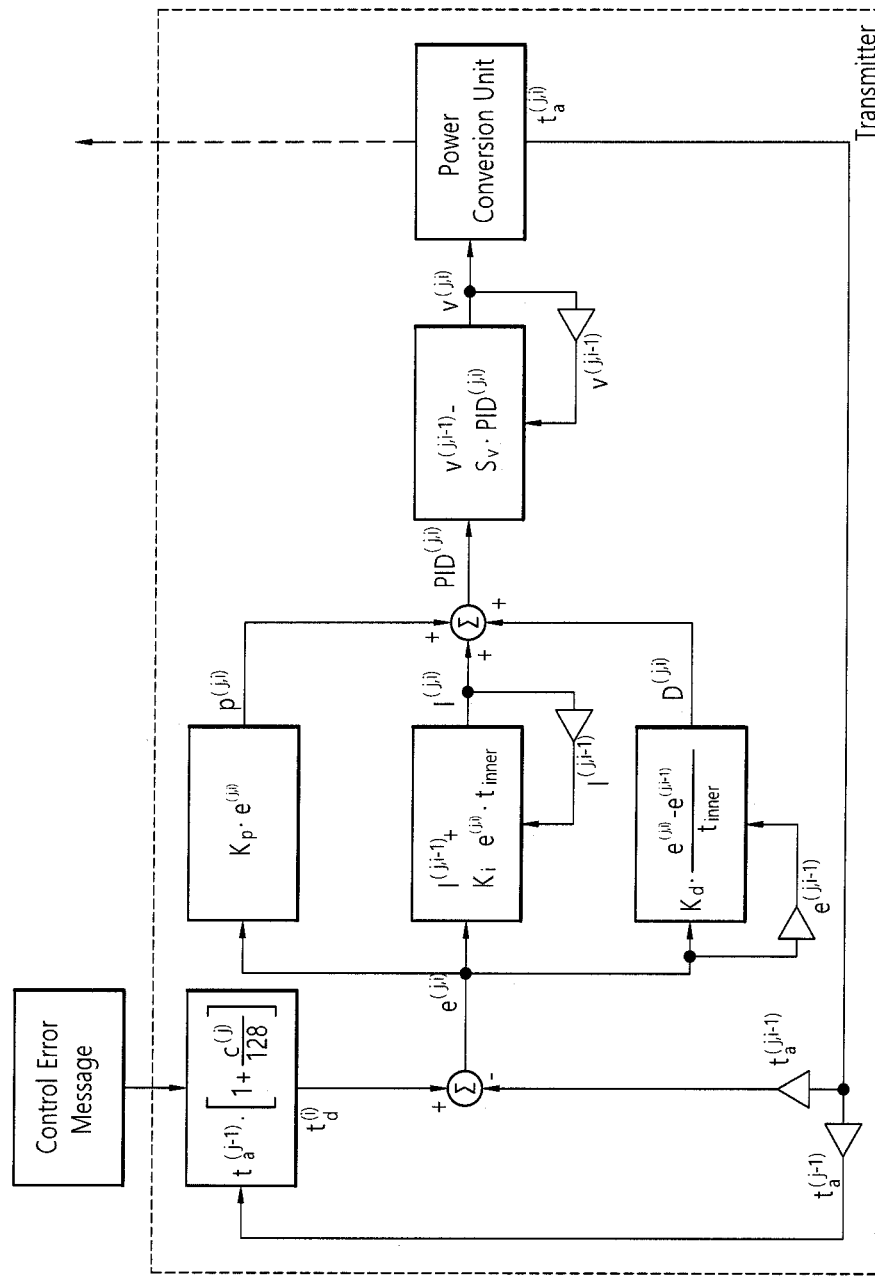
FIG. 17 is a diagram for illustrating the power transfer control algorithm of the wireless power transmission apparatus.

FIG. 17 is a diagram for illustrating the power transfer control algorithm of the wireless power transmission apparatus.

Control of power transfer of the wireless power transmission apparatus may be performed using a proportional integral differential (PID) algorithm. An example shown in FIG. 17 shows an example of the PID algorithm.

In the wireless power transmission system using the magnetic induction method, an example of PID parameters for control of an operating frequency is shown in [Table 1], and an example of PID parameters for control of a duty cycle is shown in [Table 2].

TABLE 1

| Parameter | Symbol | Value | Unit |
|---|---|---|---|
| Proportional gain | $K_p$ | 10 | $mA^{-1}$ |
| Integral gain | $K_i$ | 0.05 | $mA^{-1}ms^{-1}$ |
| Derivative gain | $K_d$ | 0 | $mA^{-1}ms$ |
| Integral term limit | $M_I$ | 3,000 | N.A. |
| PID output limit | $M_{PID}$ | 20,000 | N.A. |

TABLE 2

| Parameter | Symbol | Value | Unit |
|---|---|---|---|
| Proportional gain | $K_p$ | 10 | $mA^{-1}$ |
| Integral gain | $K_i$ | 0.05 | $mA^{-1}ms^{-1}$ |
| Derivative gain | $K_d$ | 0 | $mA^{-1}ms$ |
| Integral term limit | $M_I$ | 3,000 | N.A. |
| PID output limit | $M_{PID}$ | 20,000 | N.A. |
| Scalling factor | $S_v$ | −0.01 | % |

In the power transfer step, the wireless power transmission apparatus may adjust current of a primary coil based on control data. In this case, the control of the current of the primary coil may be performed based on the PID algorithm.

In FIG. 17, an index j=1, 2, 3, . . . indicates the sequence of "control error packets." The "control error packet" indicates a message that is received by the wireless power transmission apparatus from the wireless power reception apparatus in the power transfer step.

When a $j^{th}$ control error packet is received, the wireless power transmission apparatus may calculate a new primary cell current $t_d^{(j)}$ as in Equation 1.

$$t_d^{(j)} = t_a^{(j-1)} \cdot \left[1 + \frac{c^{(j)}}{128}\right] \qquad \text{[Equation 1]}$$

In this case, $C^{(j)}$ indicates a control error value included in the $j^{th}$ control error packet. $t_a^{(0)}$ indicates current first supplied to a primary coil in the power transfer step.

The wireless power transmission apparatus may calculate the difference between the new primary cell current and an actual primary cell current as in Equation 2.

$$e^{(j,i)} = t_d^{(j)} - t_a^{(j,i-1)} \qquad \text{[Equation 2]}$$

In this case, $t_a^{(j,i-1)}$ indicates a primary cell current determined in the $(i-1)^{th}$ repetition of a loop. $t_a^{(j,0)}$ indicates the actual primary cell current at the start of the loop. An index i=1, 2, 3, . . . $i_{max}$ indicates the repetition number of a PID algorithm loop.

The wireless power transmission apparatus may calculate a proportional term, an integral term and a derivative term as in Equation 3.

$$P^{(j,i)} = K_p \cdot e^{(j,i)},$$

$$I^{(j,i)} = I^{(j,i-1)} + K_i \cdot e^{(j,i)} \cdot t_{inner},$$

$$D^{(j,i)} = K_d \cdot \frac{e^{(j,i)} - e^{(j,i-1)}}{t_{inner}}, \qquad \text{[Equation 3]}$$

In this case, $K_p$ is a proportional gain, $K_i$ is an integral gain, $K_d$ is a derivative gain, and $t_{inner}$ is the time required to perform the PID algorithm loop.

The wireless power transmission apparatus calculates the sum of the proportional term, integral term and derivative term as in Equation 4.

$$PID^{(j,i)} = P^{(j,i)} + I^{(j,i)} + D^{(j,i)} \qquad \text{[Equation 4]}$$

In the calculation of Equation 4, the wireless power transmission apparatus needs to limit the sum $PID^{(j,i)}$.

the wireless power transmission apparatus needs to calculate a new value of a controlled variable as in Equation 5.

$$v^{(j,i)} = v^{(j,i-1)} - S_v \cdot PID^{(j,i)} \qquad \text{[Equation 5]}$$

In this case, $S_v$ is a scaling factor dependent on the controlled variable.

The new value of the controlled variable is transferred to the power conversion unit. The new value of the controlled variable may be used as the current adjustment limit width of the primary coil.

In accordance with one embodiment, the wireless power transmission apparatus may change the value of a "PID output limit" depending on the number of coils that belong to coils included in the primary coil array and that are being driven.

For example, the wireless power transmission apparatus may increase the value of the "PID output limit" as the number of cells being driven increases and may decrease the value of the "PID output limit" as the number of cells being driven decreases.

Accordingly, the protection and stable power transfer of the wireless power transmission apparatus are possible b adjusting maximum output power of each of coils within a cell.

Furthermore, in accordance with one embodiment, the wireless power transmission apparatus may limit a voltage and duty used for power control based on the number of cells being driven.

The wireless power transmission apparatus may limit power input to the primary coil array depending on the number of coils that belong to coils included in the primary coil array and that are being driven.

Furthermore, the wireless power transmission apparatus may limit output power of the inverter depending on the number of coils that belong to coils included in the primary coil array and that are being driven.

FIGS. 1 to 7 are the descriptions regarding the method for transmitting power using the magnetic resonance method, and FIGS. 8 to 12 show the methods for transmitting power using the magnetic induction method. An example in which power is transmitted using the magnetic resonance method has been described in detail in Conventional Technology 4. Furthermore, FIGS. 13 to 17 show the hybrid method.

In FIGS. 8 to 12, the magnetic induction method may be applied to a mouse pad independently of a main device in a local computing environment and may be used to transmit power to a mouse on the mouse pad.

FIGS. 18 to 21 are diagrams for illustrating a wireless power transmission network environment according to an embodiment.

Figure 18:
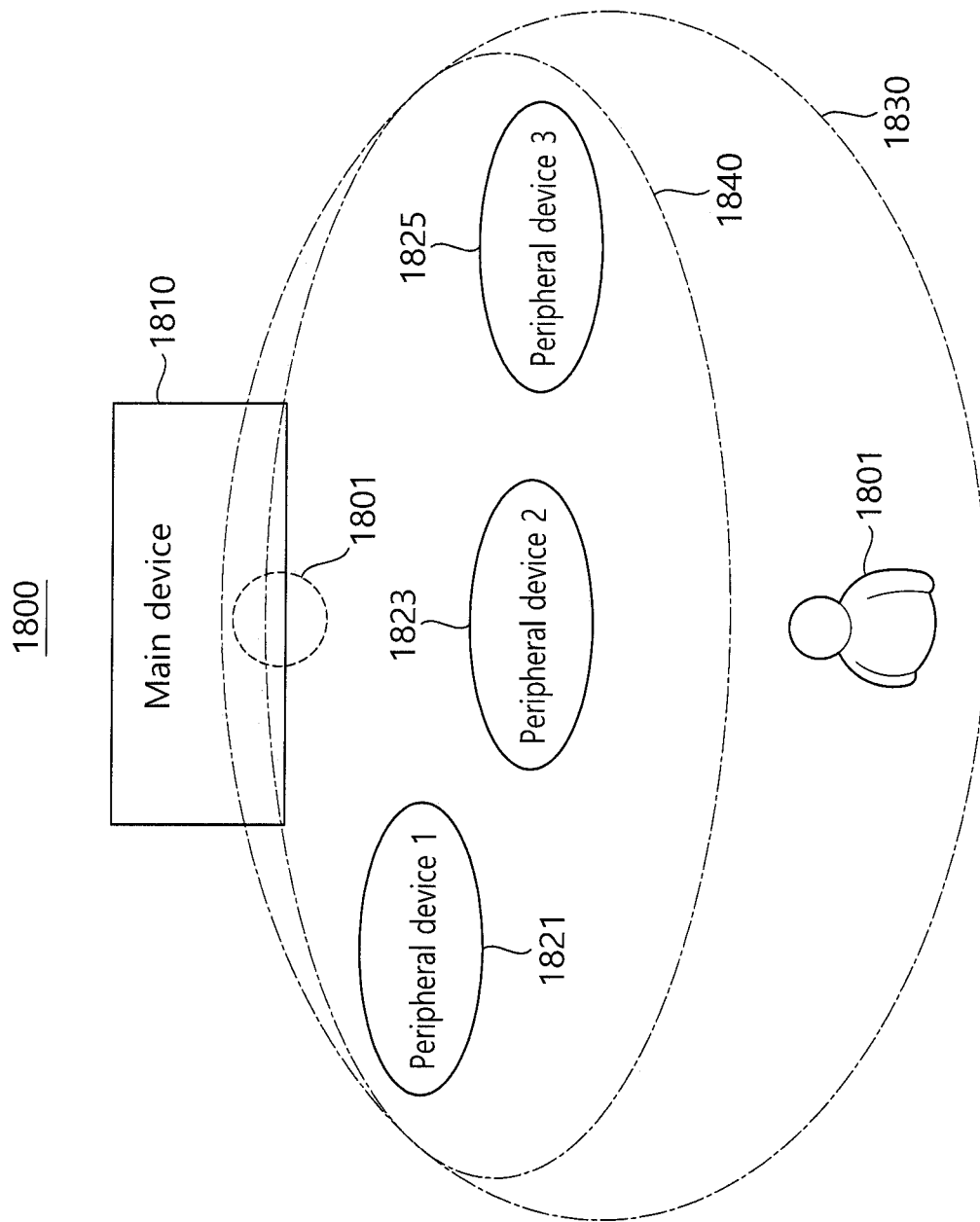
FIGS. 18 to 21 are diagrams for illustrating a wireless power transmission network environment according to an embodiment.

Referring to FIG. 18, the wireless power transmission network 1800 includes a main device 1810 and peripheral devices 1821, 1823 and 1825.

The main device 1810 may supply power to the peripheral devices 1821, 1823 and 1825 through a resonant channel. In other words, the main device 1810 may transmit the power through the magnetic resonance method capable of short-distance (about 1 meter) transmission.

Accordingly, the main device 1810 may include a wireless power transmitter 1801 capable of transmitting power using the magnetic resonance method.

A wireless power transmission network may be formed by power transfer coverage of the main device 1810. The power transfer coverage may be defined as the distance D disclosed in Conventional Technology 3 or Conventional Technology 5.

Hereinafter, the power transfer coverage of the main device 1810 may also be called "power transfer coverage of a wireless power transmission network", for convenience description.

In FIGS. 18 to 21, reference numeral 1830 indicates power transfer coverage of the main device 1810. For example, reference numeral 1830 may be power transfer coverage formed by maximum transmission power of the wireless power transmitter 1801.

It may not be preferred that a user 1801 is present within the wireless power transmission network because power transfer using the magnetic resonance method is not free from a harmfulness problem for the human body. Furthermore, it is necessary to control the power transfer coverage of the wireless power transmission network due to a problem, such as power waste or power transfer efficiency.

For example, the power transfer coverage of the wireless power transmission network may be controlled so that it is adjusted as in reference numeral 1840.

Figure 19:
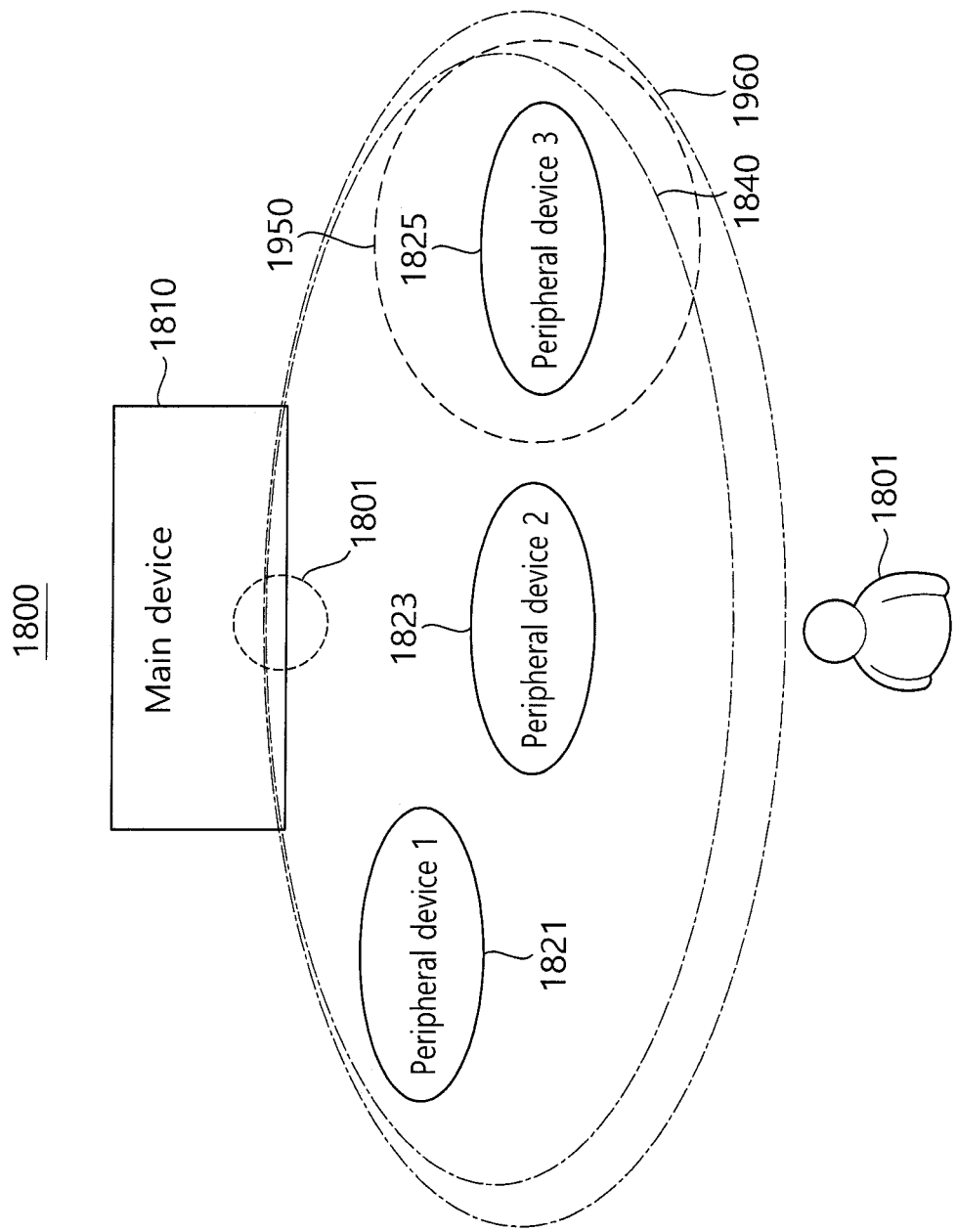

Referring to FIG. 19, the peripheral device 3 1825 may be a movable device. In this case, the movable device may be of a type that is used by a user while the user chiefly moves, such as a mouse in a local computing environment, for example. In other words, all of the peripheral devices 1821, 1823 and 1825 may be movable. However, what is movable in a wireless power transmission network may mean that a use type has mobility. For example, a monitor and a keyboard in a local computing environment may be defined to be fixed and used, and the mouse may be defined as a movable device.

In FIG. 19, reference numeral 1950 indicates a common moving range of the peripheral device 3 1825. If the peripheral device 3 1825 moves and deviates from the current wireless power transfer coverage 1840, it may be necessary to set again or adjust the wireless power transfer coverage.

Figure 20:
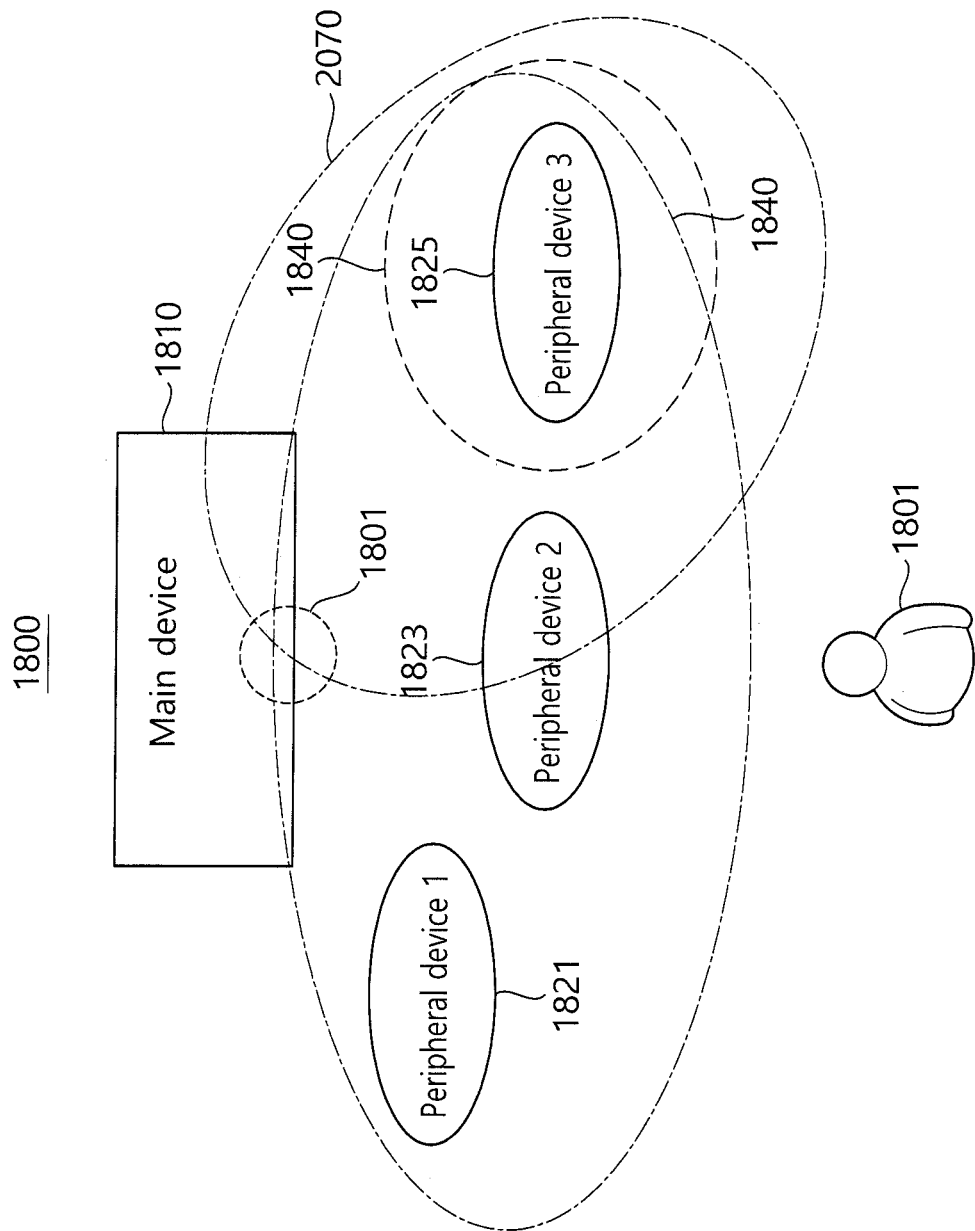

Referring to FIG. 20, if the peripheral device 3 1825 moves and deviates from the current wireless power transfer coverage 1840, the peripheral device 3 1825 may control power transfer coverage by taking into consideration the movable range 1825.

The example shown in FIG. 20 shows an example in which if information about the location of the peripheral device 3 1825 has been recognized, adjusted coverage 2070 for a movable device has been formed by adjusting the directivity of the resonator of the wireless power transmitter 1801. In other words, power transfer coverage may be controlled by adjusting the directivity of a resonant channel.

The adjusted coverage 2070 for a movable device may be formed along with predetermined power transfer coverage 1840 or may be formed independently of the power transfer coverage 1840.

Figure 21:
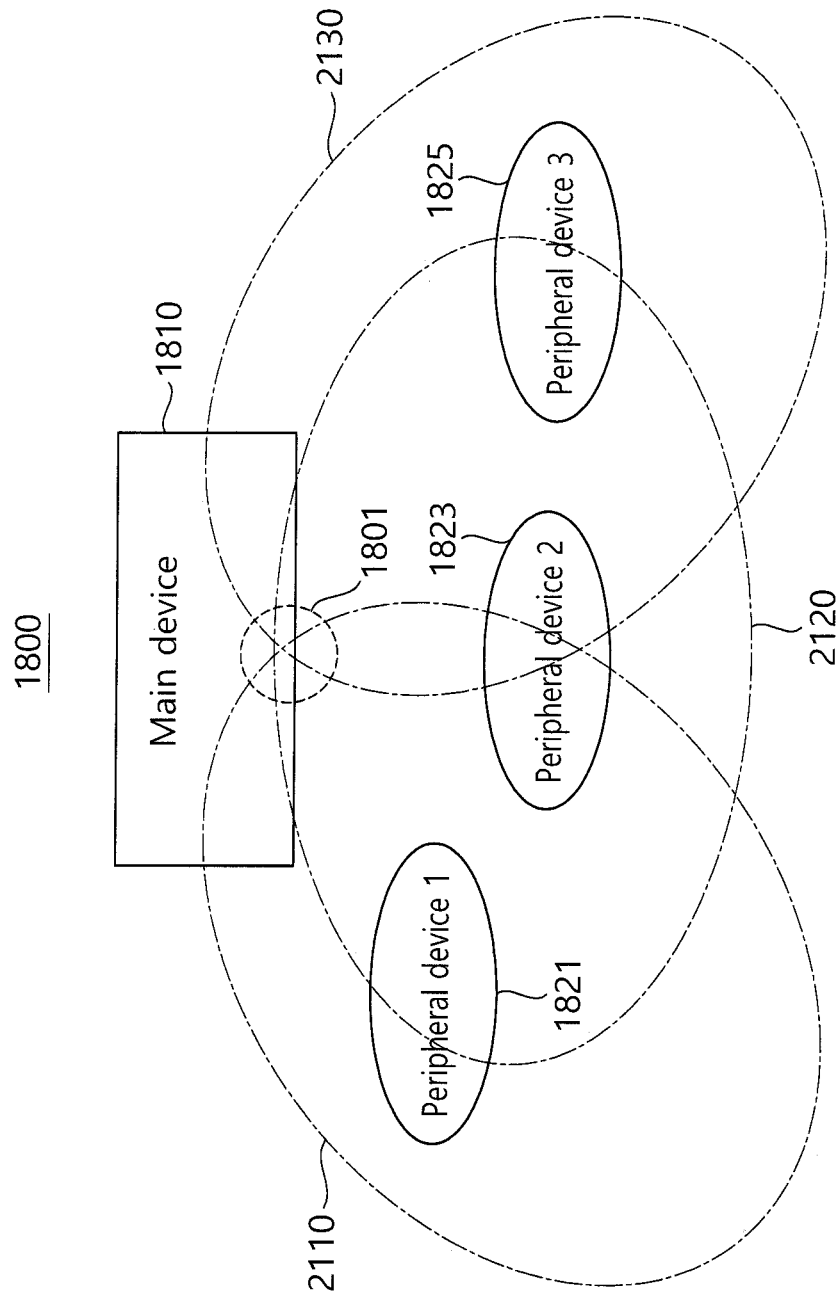

Referring to FIG. 21, the wireless power transmission network 1800 may include a plurality of sectors 2110, 2120 and 2130.

In this case, the plurality of sectors 2110, 2120 and 2130 may be formed by a plurality of loop resonators or resonators of special forms fabricated to have directivity. All of the plurality of sectors 2110, 2120 and 2130 may be formed at the same time or may be variably formed depending on the locations of peripheral devices.

In one embodiment, the main device 1810 may sequentially perform a procedure for gradually decreasing the amount of transmission power on the plurality of sectors 2110, 2120 and 2130.

For example, the main device 1810 may perform the procedure for gradually decreasing the amount of transmission power on the first sector 2110 and determine power transfer coverage for the peripheral device 1 1821. Next, the main device 1810 may perform the procedure for gradually decreasing the amount of transmission power on the second sector 2120 and determine power transfer coverage for the peripheral device 2 1823.

In this case, when the main device 1810 performs the procedure for gradually decreasing the amount of transmission power on the first sector 2110, it may stop power transfer for the second sector 2120 and the third sector 2130.

The main device 1810 may check which device is located within a corresponding sector and proper coverage by sequentially performing the procedure for gradually decreasing the amount of transmission power on the plurality of sectors 2110, 2120 and 2130.

For example, the main device 1810 may recognize the peripheral device 3 1825 located within a corresponding sector by performing power transfer on only the third sector 2130 of the plurality of sectors 2110, 2120 and 2130 and then receiving identifier information from a device that has received required power.

Figure 22:
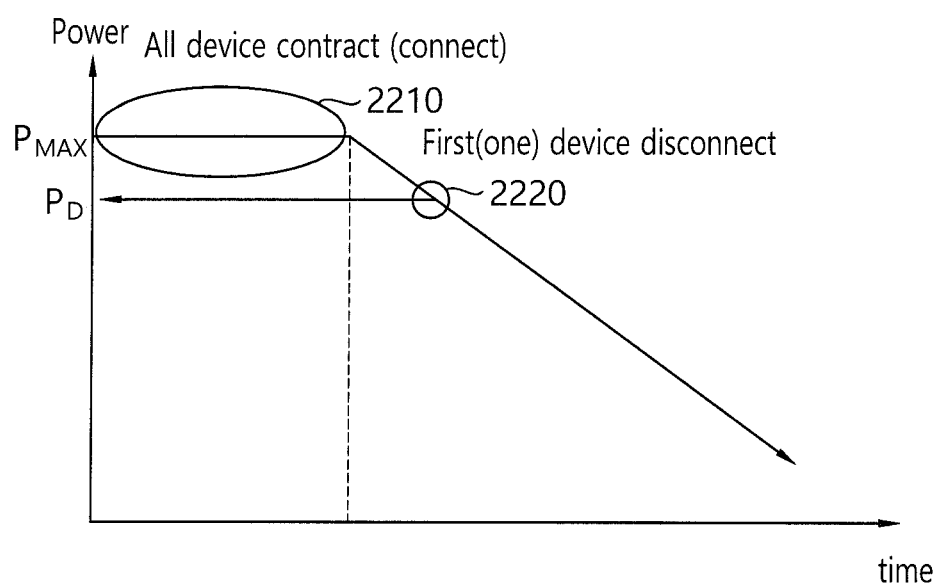
FIG. 22 is a diagram for illustrating a procedure for gradually decreasing the amount of transmission power according to an embodiment.

FIG. 22 is a diagram for illustrating the procedure for gradually decreasing the amount of transmission power according to an embodiment.

In FIGS. 18 to 21, if the amount of transmission power of the main device 1810 is a maximum value, for example, power transfer coverage may be formed like reference numeral 1830.

In this case, all of the peripheral devices 1821, 1823 and 1825 may be defined to be the state in which they have been connected to a wireless power transmission network. In contrast, power reception efficiency of any one of the peripheral devices 1821, 1823 and 1825 may be reduced to a reference value or less due to a reduction in the amount of transmission power of the main device 1810 or the amount of power received may change to the state in which it is smaller than a required minimum value.

If power reception efficiency of any one of the peripheral devices 1821, 1823 and 1825 is reduced to a reference value or less due to a reduction in the amount of transmission power of the main device 1810 or the amount of power received changes to the state in which it is smaller than a required minimum value, it may be defined to be the state in which any one of the peripheral devices 1821, 1823 and 1825 has been disconnected in a wireless power transmission network.

Furthermore, a peripheral device that has generated communication disconnection from the main device 1810 may be defined to be the state in which it has been disconnected in a wireless power transmission network.

Reference numeral 2210 in FIG. 22 indicates the interval in which all of the peripheral devices 1821, 1823 and 1825 have been connected to a wireless power transmission network.

In the state in which all of the peripheral devices 1821, 1823 and 1825 have been connected to the wireless power transmission network, when the amount of transmission power of the main device 1810 gradually decreases, there may be a device (e.g., the peripheral device 3 of FIG. 18) that is first disconnected from the wireless power transmission network at a specific moment like reference numeral 2220.

First, the amount of power at the moment when the device disconnected from the wireless power transmission network is generated may be defined to be PD as shown in FIG. 22.

The main device 1810 may determine the amount of transmission power based on the value $P_D$. For example, the main device 1810 may set the amount of transmission power to be greater than the value $P_D$ by a specific value or more or may increase or decrease the amount of transmission power by a predetermined offset value compared to the value $P_D$, may measure the power reception state of a device that has been disconnected from a wireless power transmission network again, and may determine the most proper transmission power value.

Control of power transfer coverage in a wireless power transmission network is described in detail below with reference to FIGS. 23 to 24.

Figure 23:
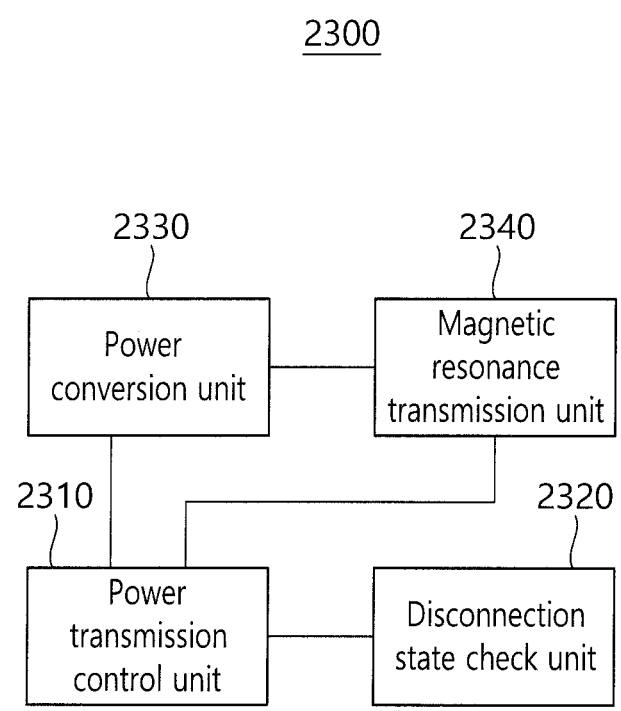
FIG. 23 is a diagram for illustrating an example of the configuration of a power transfer coverage control apparatus in a wireless power transmission network according to an embodiment.

FIG. 23 is a diagram for illustrating an example of the configuration of a power transfer coverage control apparatus in a wireless power transmission network according to an embodiment.

The power transfer coverage control apparatus 2300 may be included in the wireless power transmitter 1801 of FIG. 18. Accordingly, the power transfer coverage control apparatus 2300 may additionally include the variety of elements described with reference to FIGS. 1 to 7 in addition to the elements shown in FIG. 23. Furthermore, the power transfer coverage control apparatus 2300 may perform the various operations described with reference to FIGS. 1 to 7.

The power transfer coverage control apparatus 2300 controls power transfer coverage of a wireless power transmission network including a plurality of peripheral devices supplied with a main device through a resonant channel.

The power transfer coverage control apparatus 2300 includes a power transmission control unit 2310 and a disconnection state check unit 2320. The power transfer coverage control apparatus 2300 may further include a power conversion unit 2330 which generates transmission power and a magnetic resonance transmission unit 2340 which includes a resonator and impedance matching circuit.

The operations of the power conversion unit 2330 and the magnetic resonance transmission unit 2340 have been described with reference to FIGS. 1 to 7 and FIGS. 13 to 15, and a detailed description of them is omitted.

The power transmission control unit 2310 controls the amount of transmission power of the main device. In other words, the power transmission control unit 2310 may control the amount of transmission power by controlling the power conversion unit 2330.

The power transmission control unit 2310 forms power transfer coverage based on the amount of transmission power at the moment when a wireless power transmission network is disconnected.

The power transmission control unit 2310 may apply a predetermined power margin to the amount of transmission power at the moment when the wireless power transmission network is disconnected by taking into consideration moving frequency or the movable range of a target device that has been disconnected from the wireless power transmission network.

For example, a movable device, such as a mouse in a local computing environment, may set a power margin of about several milliwatts by taking into consideration the movable range of a corresponding device. In other words, the movable device may determine a value, obtained by adding a power margin to a value $P_D$ at the moment when a power transmission network is disconnected, to be the amount of transmission power.

The disconnection state check unit 2320 checks the disconnection state of any one of a plurality of peripheral devices from a wireless power transmission network.

In this case, the plurality of peripheral devices may include the input/output device of the main device. Accordingly, the wireless power transmission network may provide a local computing environment.

The disconnection state check unit 2320 may recognize information about the identifier of each of the plurality of peripheral devices, may periodically receive feedback for power reception state information based on the identifier information of each of the plurality of peripheral devices while performing a procedure for gradually decreasing the amount of transmission power, and may check the disconnection of any one of the plurality of peripheral devices from the wireless power transmission network based on the power reception state information.

In this case, the identifier information may be received through wireless communication, such a Bluetooth, from a peripheral device, and the type of device may be confirmed based on the identifier information. In the local computing environment, the main device may confirm information about the type of each of peripheral devices based on device information stored in a main processor. The identifier information may be information indicative of the type of corresponding device, for example, a mouse device, a keyboard, a media player, a speaker or a monitor. Furthermore, the identifier information may be an identifier for device-unique identification or an identifier assigned by the main device. Accordingly, the identifier information may include information about the type of device and may be a temporary identifier which is used in a wireless power transmission network only.

The power reception state information may be transmitted or received through a short-distance wireless communication channel.

The disconnection state check unit 2320 may determine whether the wireless power transmission network is disconnected or not based on power transfer efficiency or the predetermined amount of reference power for each device type.

For example, in the case where a device type corresponds to a device that needs to be charged by receiving power of 1.5 mWatt, if power of 1.2 mWatt or less is received, it may be determined that a wireless power transmission network has been disconnected. Fed-back state information may be the amount of power received itself or may be power reception efficiency information. If information fed back by a specific device is not received for a predetermined time, a wireless power transmission network may be determined to be a disconnection state.

The disconnection state check unit 2320 may determine the movability of a target device based on information about the identifier of the target device that has been disconnected from a wireless power transmission network, and may adjust the directivity of a wireless resonant channel by taking into consideration the location of the target device if the target device is movable.

Assuming that a corresponding device will be located at a predetermined location as shown in FIG. 21, the directivity of the resonant channel may be adjusted. If a high directivity antenna for short-distance communication is used, the current location of a device can be checked very precisely.

In this case, the procedure for gradually decreasing the amount of transmission power may include a process of increasing the amount of transmission power and then decreasing the amount of transmission power again if the target device is movable. Accordingly, an application example in which a process of determining the amount of transmission power while a user directly moves a movable device is repeatedly performed is possible.

Furthermore, if wireless power receivers included in the peripheral devices have the same resonator type, an application example in which a specific device is located at a required maximum distance from the main device and the amount of transmission power is determined is possible.

Figure 24:
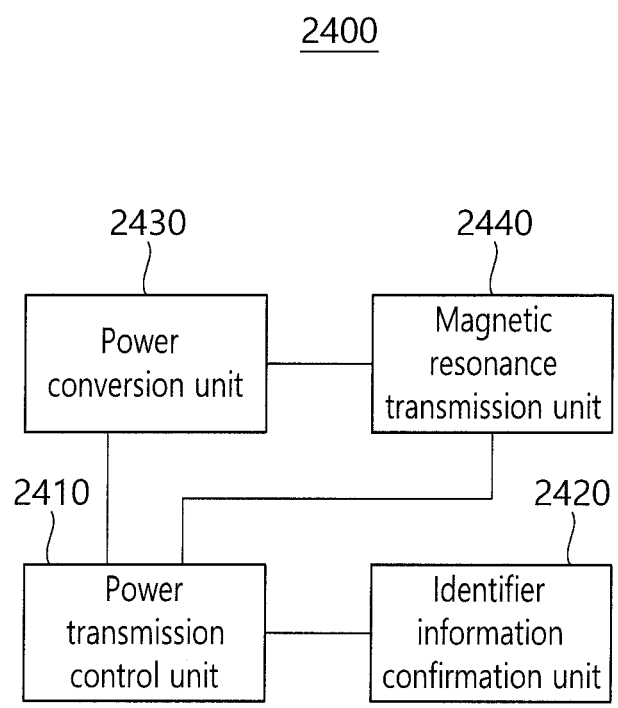
FIG. 24 is a diagram for illustrating an example of the configuration of a power transfer coverage control apparatus in a wireless power transmission network according to another embodiment.

FIG. 24 is a diagram for illustrating an example of the configuration of a power transfer coverage control apparatus in a wireless power transmission network according to another embodiment.

Referring to FIG. 24, the power transfer coverage control apparatus 2400 has a configuration similar to that of the power transfer coverage control apparatus 2300. However, the power transfer coverage control apparatus 2400 includes an identifier information confirmation unit 2420 unlike the power transfer coverage control apparatus 2300.

The identifier information confirmation unit 2420 confirms information about the identifier of each of a plurality of peripheral devices.

The power transmission control unit 2410 checks a movable target device of a plurality of devices based on the identifier information, and forms power transfer coverage by adjusting the amount of transmission power for forming the power transfer coverage or the directivity of a resonant channel based on a movable range of the target device.

In this case, information about the movable range of the target device may have been previously stored in a main device or a power transfer coverage control apparatus for each device type.

The power transmission control unit 2410 may form the power transfer coverage by applying a predetermined power margin to the current amount of transmission power. In this case, the predetermined power margin may be a value predetermined by taking into consideration the movable range of the target device.

The power transmission control unit 2410 may repeatedly perform the procedure of gradually decreasing the amount of transmission power of the main device, may check the state in which the target device is disconnected from a wireless power transmission network while repeatedly performing the procedure, and may form the power transfer coverage based on the amount of transmission power at the moments when the wireless power transmission network is disconnected.

In this case, the power transmission control unit 2410 may determine a maximum value of the amounts of transmission power at the moments when the wireless power transmission network is disconnected to be the final amount of transmission power.

In this case, the power transmission control unit 2410 may determine the mean value of the amounts of transmission power at the moments when the wireless power transmission network is disconnected to be the final amount of transmission power.

The apparatus described above may be implemented in the form of a combination of hardware components, software components, and/or hardware components and software components. For example, the apparatus and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. A processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may be aware that the processing device may include a plurality of processing elements and/or a plurality of types of processing elements. For example, the processing device may include a plurality of processors or a single processor and a single controller. Furthermore, other processing configuration, such as a parallel processor, is also possible.

Software may include a computer program, code, an instruction or one or more combinations of them and may configure the processing device so that it operates as desired or may instruct the processing device independently or collectively. Software and/or data may be interpreted by the processing device or may be embodied in a machine, component, physical device, virtual equipment or computer storage medium or device of any type or a transmitted signal wave permanently or temporarily in order to provide an instruction or data to the processing device. Software may be distributed to computer systems connected over a network and may be stored or executed in a distributed manner. Software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may be known to those skilled in computer software. The computer-readable recording medium includes a hardware device specially configured to store and execute the program instruction, for example, magnetic media such as a hard disk, a floppy disk, and a magnetic tape, optical media such as CD-ROM or a DVD, magneto-optical media such as a floptical disk, ROM, RAM, or flash memory. Examples of the program instruction may include both machine-language code, such as code written by a compiler, and high-level language code executable by a computer using an interpreter. The hardware device may be configured in the form of one or more software modules for executing the operation of the embodiment, and the vice versa.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

The invention claimed is:

1. A method performed by a wireless power transmitter for controlling wireless power transmission, comprising:
    forming a wireless power transmission network in which the wireless power transmitter is configured to supply wireless power to a plurality of peripheral devices;
    gradually decreasing an amount of transmission power of the wireless power transmitter while receiving periodic feedback from the plurality of peripheral devices;
    determining, by the wireless power transmitter, that a first peripheral device of the plurality of peripheral devices is disconnected from the wireless power transmission network when the periodic feedback is not received from the first peripheral device for a predetermined time; and
    controlling an output power of the wireless power transmitter based, at least in part, on the amount of transmission power when the first peripheral device is disconnected from the wireless power transmission network.

2. The method of claim 1, wherein the wireless power transmission network provides a local computing environment in which the plurality of peripheral devices are peripheral devices of a main device.

3. The method of claim 1,
    wherein the feedback from the plurality of peripheral devices includes power reception state information about the plurality of peripheral devices; and
    wherein controlling the output power of the wireless power transmitter includes controlling the output power based, at least in part, on the power reception state information.

4. The method of claim 1, further comprising:
    obtaining identifier information about the first peripheral device disconnected from the wireless power transmission network;
    determining a moving frequency or a movable range of the first peripheral device based on the identifier information; and
    applying a predetermined power margin to the output power based, at least in part, on the moving frequency or the movable range.

5. The method of claim 1, further comprising:
    determining a movability of the first peripheral device based on identifier information about the first peripheral device; and
    adjusting a directivity of a wireless resonant channel by taking into consideration a location of the first peripheral device if the first peripheral device is movable.

6. The method of claim 1, further comprising:
    determining a movability of the first peripheral device based on identifier information about the first peripheral device; and
    increasing the amount of transmission power before decreasing the increased amount of transmission power again if the first peripheral device is movable.

7. The method of claim 1, wherein the wireless power transmitter is configured to supply the power to the plurality of peripheral devices via a resonant channel.

8. The method of claim 1, wherein the first peripheral device is a mouse of a local computing environment.

9. An apparatus of a wireless power transmission network, the apparatus comprising:

a wireless power transmitter configured to form a wireless power transmission network and to supply wireless power to a plurality of peripheral devices of the wireless power transmission network; and a controller configured to:

gradually decrease an amount of transmission power of the wireless power transmitter while receiving periodic feedback from the plurality of peripheral devices;

determining, by the wireless power transmitter, that a first peripheral device of the plurality of peripheral devices is disconnected from the wireless power transmission network when the periodic feedback is not received from the first peripheral device for a predetermined time; and control an output power of the wireless power transmitter based, at least in part, on the amount of transmission power when the first peripheral device is disconnected from the wireless power transmission network.

10. The apparatus of claim 9, wherein the wireless power transmission network provides a local computing environment in which the plurality of peripheral devices are peripheral devices of a main device.

11. The apparatus of claim 9, wherein the feedback from the plurality of peripheral devices includes power reception state information, and wherein the controller is further configured to control the output power based, at least in part, on the power reception state information.

12. The apparatus of claim 9, wherein the controller is further configured to:

obtain identifier information about the first peripheral device disconnected from the wireless power transmission network;

determine a moving frequency or a movable range of the first peripheral device based on the identifier information; and apply a predetermined power margin to the output power based, at least in part, on the moving frequency or the movable range.

13. The apparatus of claim 9, wherein the controller is further configured to:

determine a movability of the first peripheral device based on identifier information about the first peripheral device; and adjust a directivity of a wireless resonant channel by taking into consideration a location of the first peripheral device if the first peripheral device is movable.

14. The apparatus of claim 9, wherein the controller is further configured to:

determine a movability of the first peripheral device based on identifier information about the first peripheral device; and increase the amount of transmission power before decreasing the increased amount of transmission power again if the first peripheral device is movable.

15. A method performed by a wireless power transmitter for controlling wireless power transmission, comprising:

forming a wireless power transmission network in which the wireless power transmitter is configured to concurrently supply wireless power to a plurality of peripheral devices via a resonant channel;

gradually decreasing an amount of transmission power of the wireless power transmitter while supplying the wireless power via the resonant channel;

determining, by the wireless power transmitter, a first amount of the transmission power that causes a first peripheral device of the plurality of peripheral devices to disconnect from the wireless power transmission network; and controlling a transmission power setting of the wireless power transmitter based, at least in part, on the first amount of the transmission power determined to cause the first peripheral device to disconnect from the wireless power transmission network.

16. The method of claim 15, wherein the wireless power transmission network provides a local computing environment in which the plurality of peripheral devices are peripheral devices of a main device.

17. The method of claim 15, further comprising:

receiving periodic feedback from the plurality of peripheral devices, the feedback including power reception state information about the plurality of peripheral devices; and controlling the transmission power setting of the wireless power transmitter based, at least in part, on the power reception state information.

18. The method of claim 15, further comprising:

obtaining identifier information about the first peripheral device disconnected from the wireless power transmission network;

determining a moving frequency or a movable range of the first peripheral device based on the identifier information; and applying a predetermined power margin to the output power based, at least in part, on the moving frequency or the movable range.

19. The method of claim 15, further comprising:

determining a movability of the first peripheral device based on identifier information about the first peripheral device; and adjusting a directivity of a wireless resonant channel by taking into consideration a location of the first peripheral device if the first peripheral device is movable.

20. The method of claim 15, further comprising:

determining a movability of the first peripheral device based on identifier information about the first peripheral device; and increasing the amount of transmission power before decreasing the increased amount of transmission power again if the first peripheral device is movable.

* * * * *